US009225786B1

(12) United States Patent
Ebert

(10) Patent No.: US 9,225,786 B1
(45) Date of Patent: Dec. 29, 2015

(54) INTELLIGENCE MARKETPLACE SYSTEM AND METHOD

(76) Inventor: Peter Ebert, Menlo Park, CA (US)

( * ) Notice: Subject to any disclaimer, the term of this patent is extended or adjusted under 35 U.S.C. 154(b) by 1005 days.

(21) Appl. No.: 13/225,403

(22) Filed: Sep. 2, 2011

Related U.S. Application Data

(60) Provisional application No. 61/380,053, filed on Sep. 3, 2010, provisional application No. 61/437,625, filed on Jan. 29, 2011, provisional application No. 61/454,300, filed on Mar. 18, 2011.

(51) Int. Cl.
*G06F 15/16* (2006.01)
*H04L 29/08* (2006.01)
*H04L 12/58* (2006.01)

(52) U.S. Cl.
CPC ............... *H04L 67/18* (2013.01); *H04L 51/32* (2013.01)

(58) Field of Classification Search
USPC ........................................................ 709/204
See application file for complete search history.

(56) References Cited

U.S. PATENT DOCUMENTS

| | | | | |
|---|---|---|---|---|
| 7,761,850 B2* | 7/2010 | Kilian-Kehr | ................. | 717/120 |
| 7,958,027 B2* | 6/2011 | Lawrence | ........................ | 705/35 |
| 7,962,891 B2* | 6/2011 | Kimelman et al. | ........... | 717/104 |
| 8,094,905 B2* | 1/2012 | Bissantz | ....................... | 382/131 |
| 8,271,461 B2* | 9/2012 | Pike et al. | ..................... | 707/695 |
| 8,301,687 B2* | 10/2012 | Rokicki et al. | ................ | 709/201 |
| 8,346,785 B1* | 1/2013 | Benton, Jr. | .................... | 707/756 |
| 8,386,327 B2* | 2/2013 | Blackhurst et al. | .......... | 705/26.1 |
| 8,413,070 B1* | 4/2013 | Castrucci et al. | ............. | 715/788 |
| 8,453,163 B2* | 5/2013 | Kothamasu et al. | .......... | 719/313 |
| 8,745,052 B2* | 6/2014 | Seshadrinathan et al. | .... | 707/736 |
| 8,775,204 B2* | 7/2014 | Thomas | ........................... | 705/2 |
| 2009/0064182 A1* | 3/2009 | Holar et al. | ................... | 719/314 |
| 2012/0254301 A1* | 10/2012 | Fiero | ............................ | 709/203 |
| 2012/0265675 A1* | 10/2012 | Lawrence | ....................... | 705/39 |
| 2013/0346884 A1* | 12/2013 | Bhogal et al. | ................ | 715/757 |
| 2014/0180961 A1* | 6/2014 | Hankins et al. | ............... | 705/348 |

* cited by examiner

*Primary Examiner* — Melvin H Pollack

(57) ABSTRACT

An apparatus and method for creating and using a multitude of information artifacts to rapidly share intelligence data, trigger actions and generate income. The information artifacts are designed in such a way that they can be easily updated, shared, analyzed, consumed and combined, for example, in order to create further enriched information artifacts providing higher levels of insight and alternative or additional income potential.

14 Claims, 23 Drawing Sheets

FIG. 20

INTELLIGENCE MARKETPLACE SYSTEM AND METHOD

CROSS-REFERENCE TO RELATED APPLICATIONS

This application claims the benefit of the following provisional patent applications all filed by the present inventor: (a) Provisional Application No. 61/380,053, filed Sep. 3, 2010, (b) Provisional Application No. 61/437,625, filed Jan. 29, 2011, (c) Provisional Application No. 61/454,300, filed Mar. 18, 2011.

FEDERALLY SPONSORED RESEARCH

Not Applicable

SEQUENCE LISTING OR PROGRAM

Not Applicable

BACKGROUND

1. Field of the Invention

The present invention relates to enabling a multitude of participants to publish and subscribe to information artifacts that can be used to rapidly share intelligence data, trigger actions and generate income.

The information artifacts, in the following description called triggers, are designed in such a way that they can be easily created, updated, shared, analyzed and consumed by people as well as by computer-implemented systems.

In addition, the information artifacts can be easily combined, for example, in order to create further enriched information artifacts providing higher levels of insight or invoke predetermined actions once a predetermined set of conditions is fulfilled, thus providing additional value to subscribers with respective additional income potential for publishers.

The term participants shall include, but not be limited to, individuals, businesses and their respective delegates including information systems. A participant may publish one or more triggers, subscribe to one or more triggers, or both.

2. Background of the Invention

A steadily increasing, very large amount of mostly unstructured electronic content is being published worldwide. However, for consumers of such content, it is typically not easy to keep track of, combine, refine and apply such content in an effective way according to their respective needs. For providers of such information, it is typically not easy to effectively monetize their published information.

In addition, while it can be very important for a multitude of consumers to receive crucial information with as little delay as possible, for example for online stock traders, it is typically a significant challenge for providers to deliver such requested information with minimal delays, particularly to large audiences.

SUMMARY

The invented system addresses the above-mentioned challenges as described in detail below. Additional objects and advantages of the present invention will become apparent to those skilled in the art based on the following drawings and detailed description.

DRAWINGS

Figure 1:
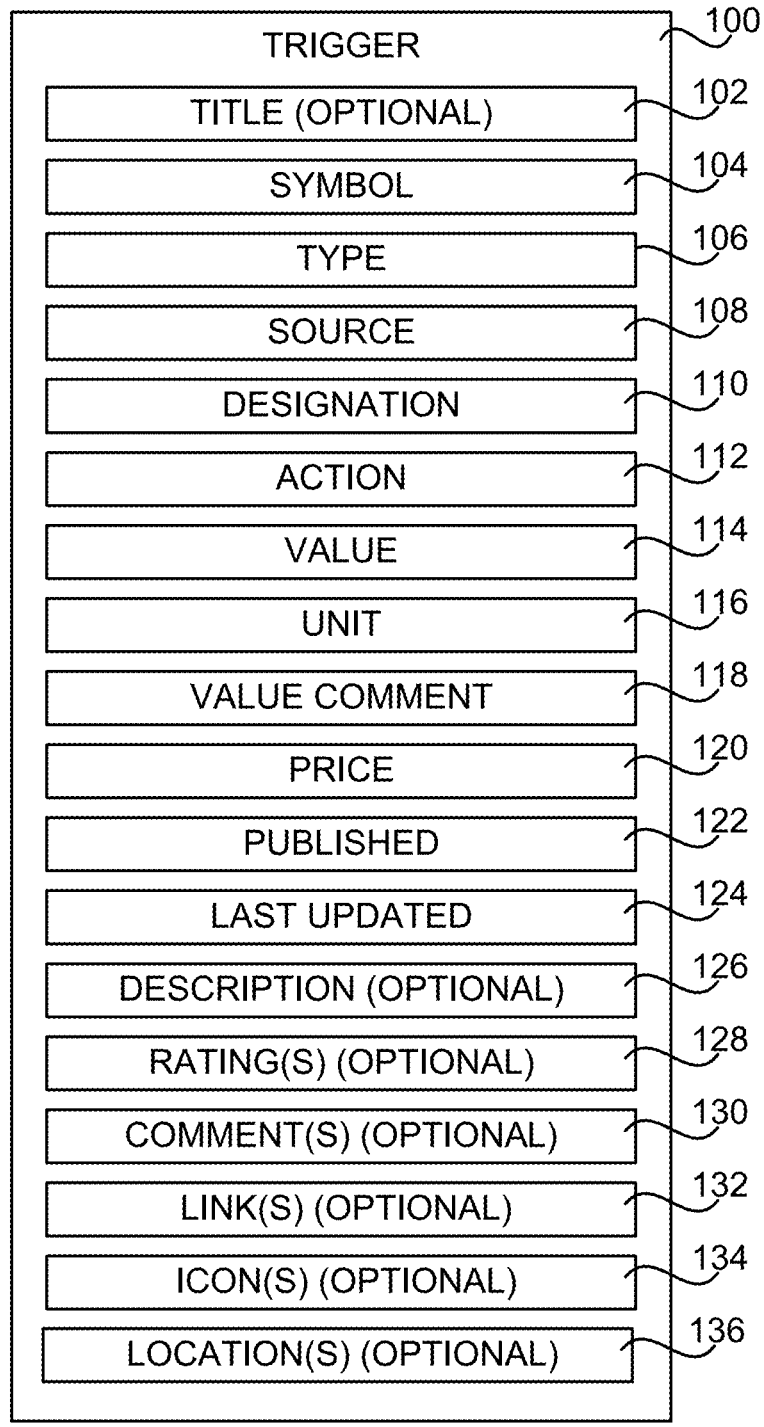
Figure 2:
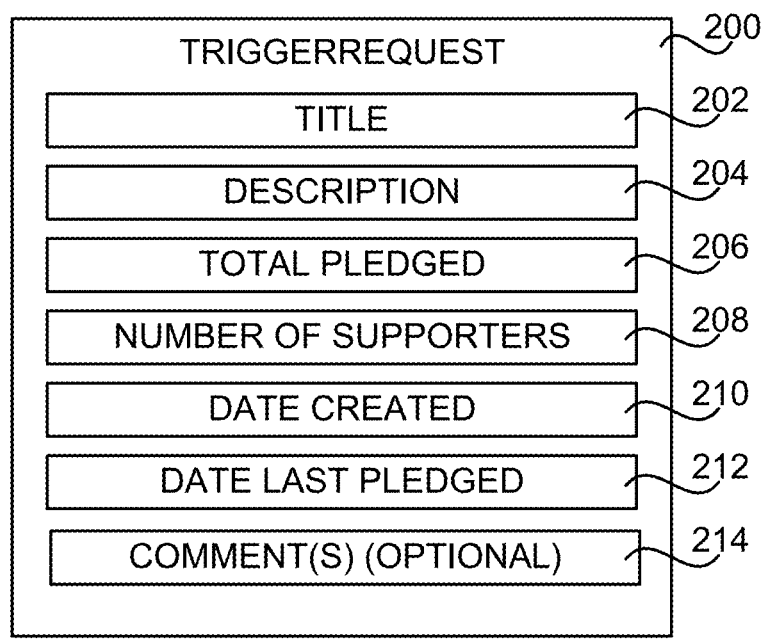
Figure 3:
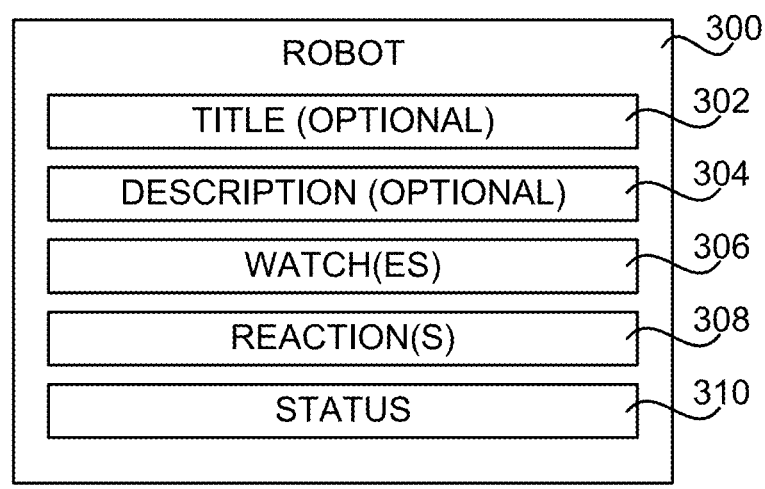
Figure 4:
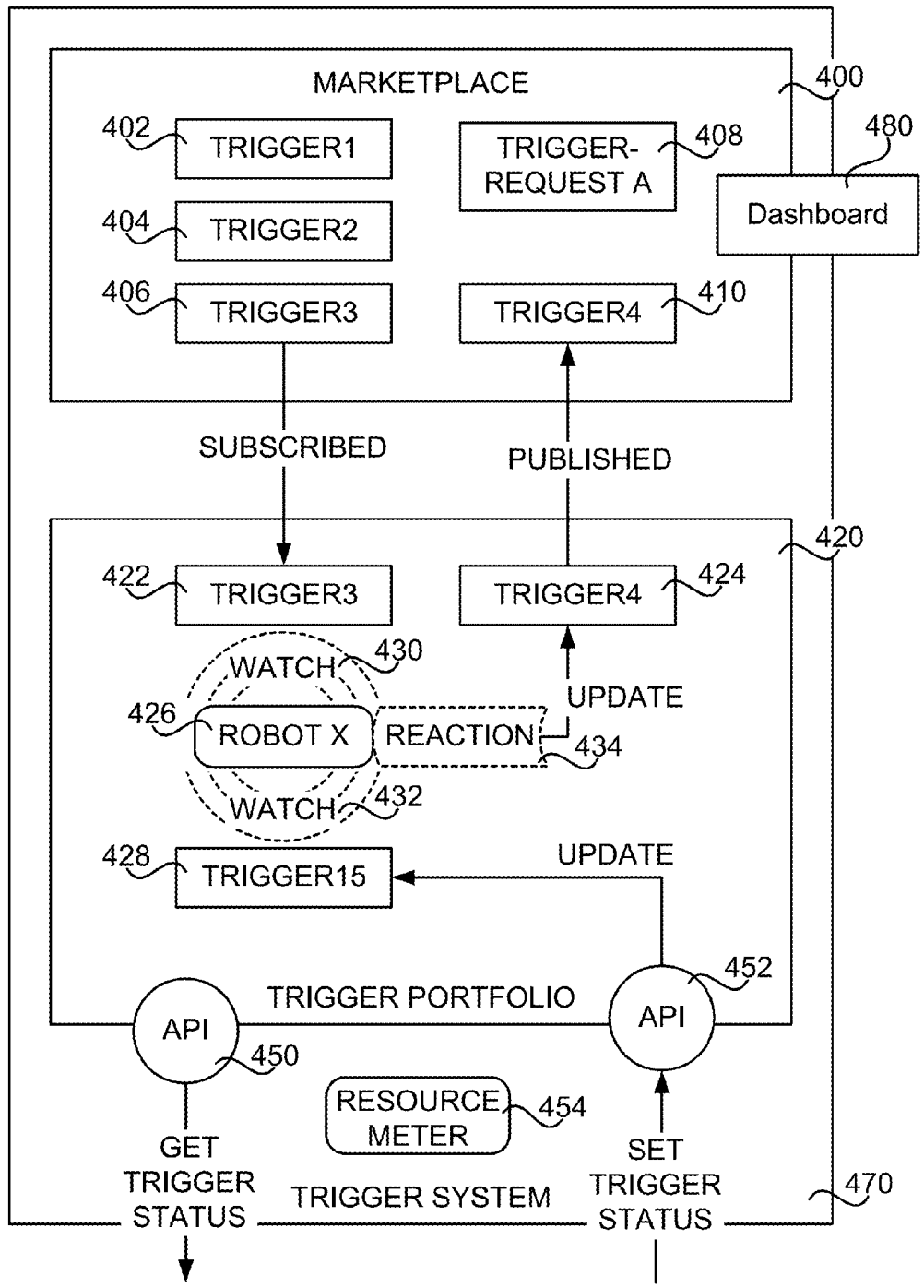
Figure 5:
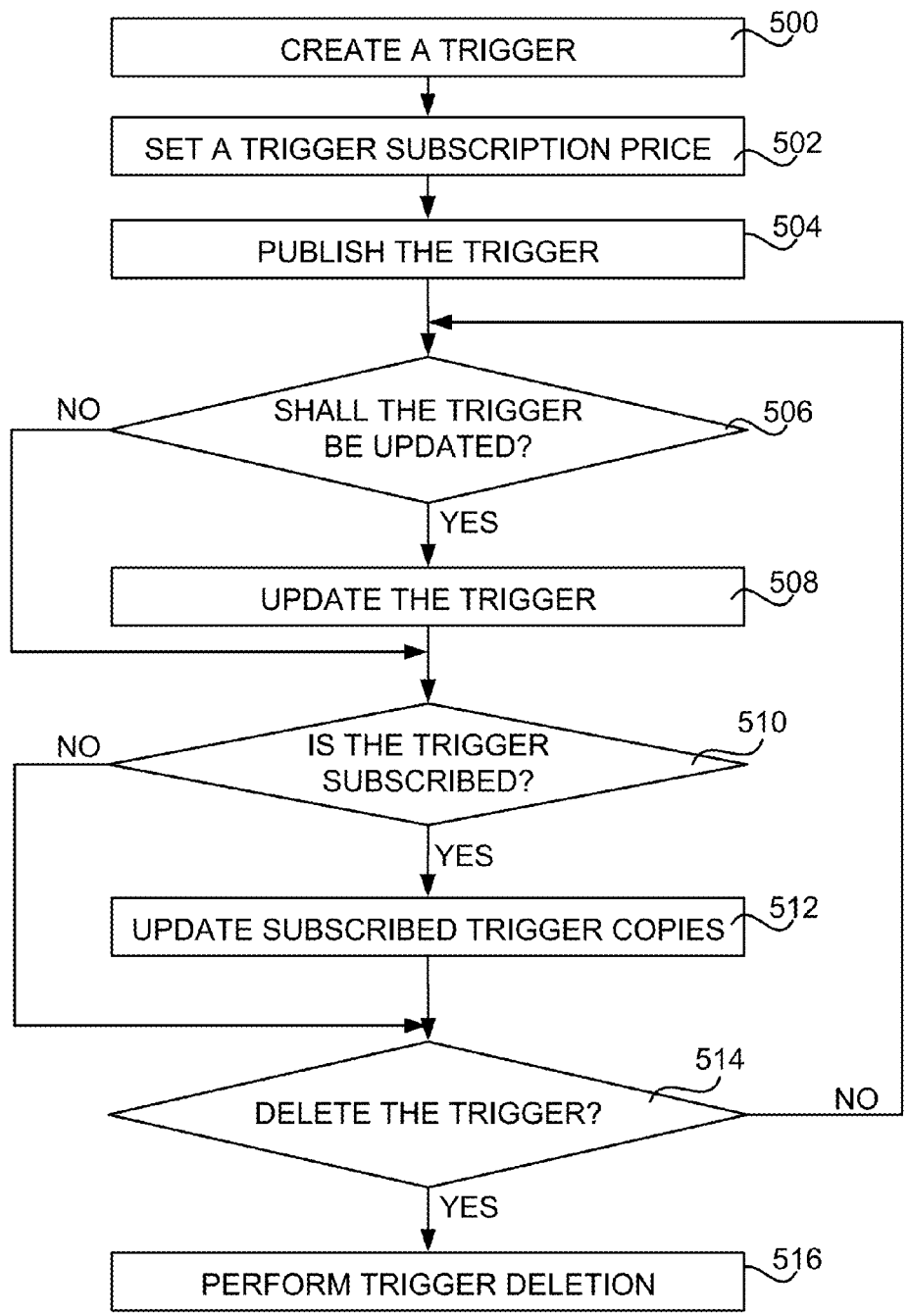
Figure 6:
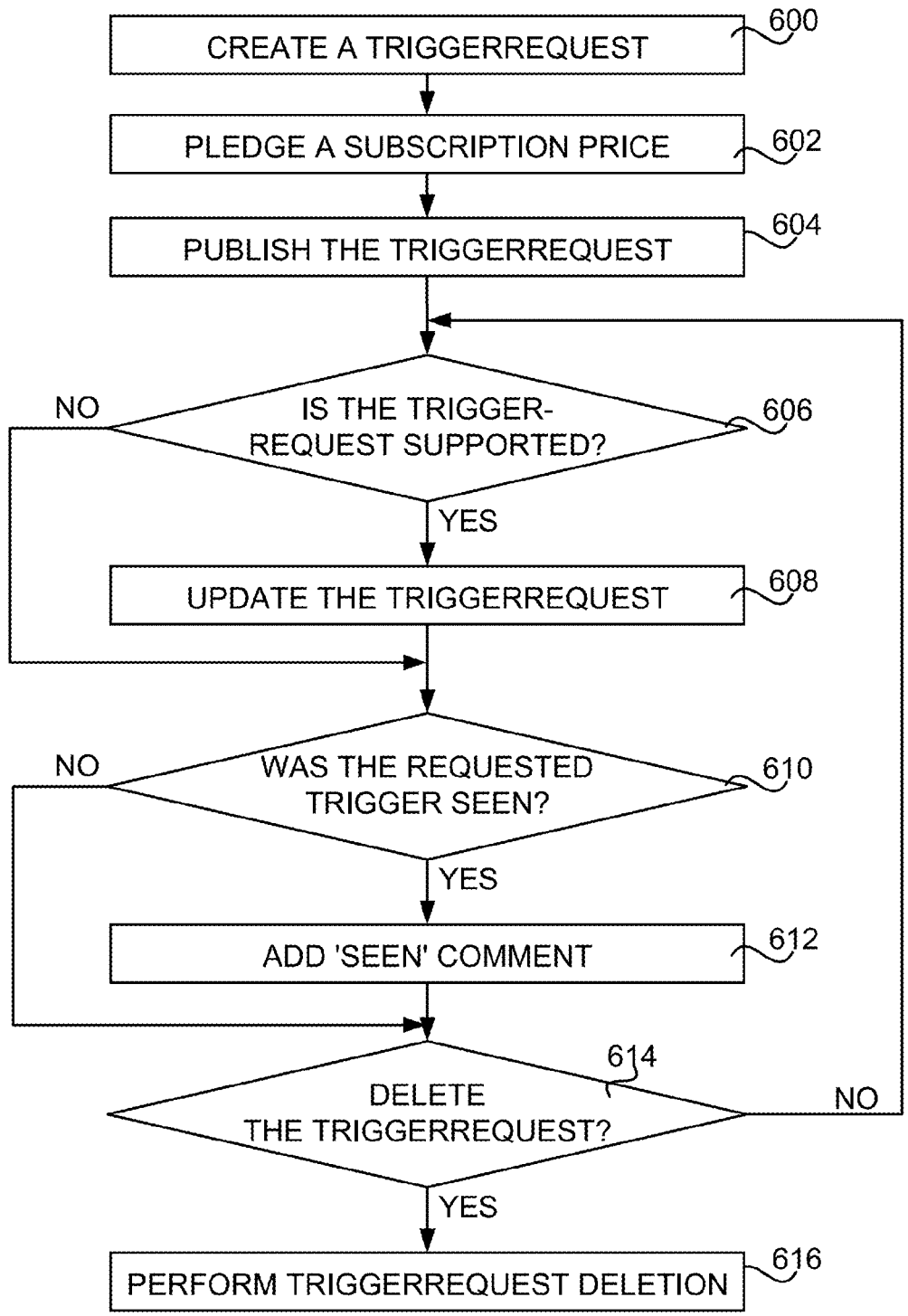
Figure 7:
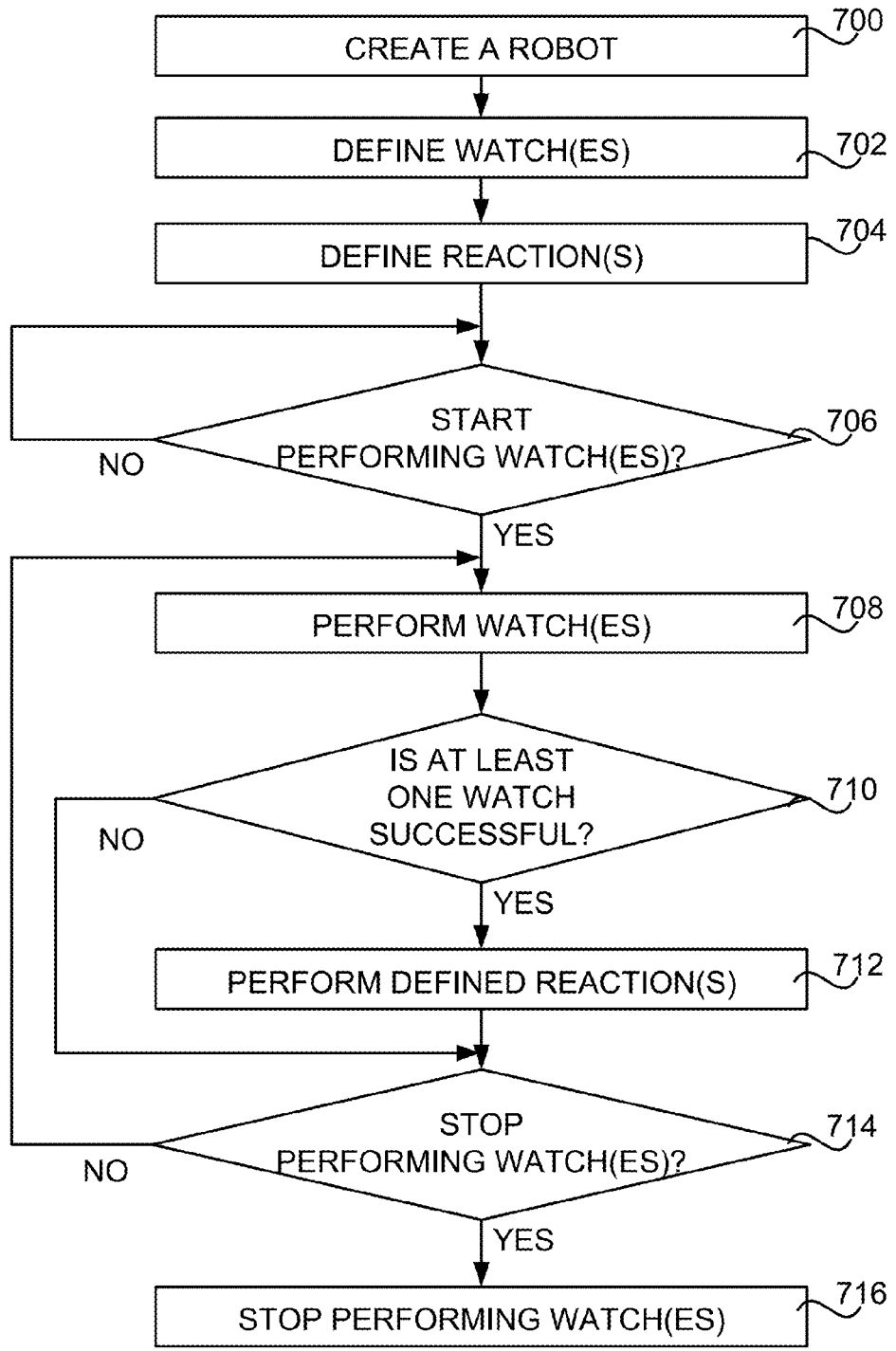
Figure 8:
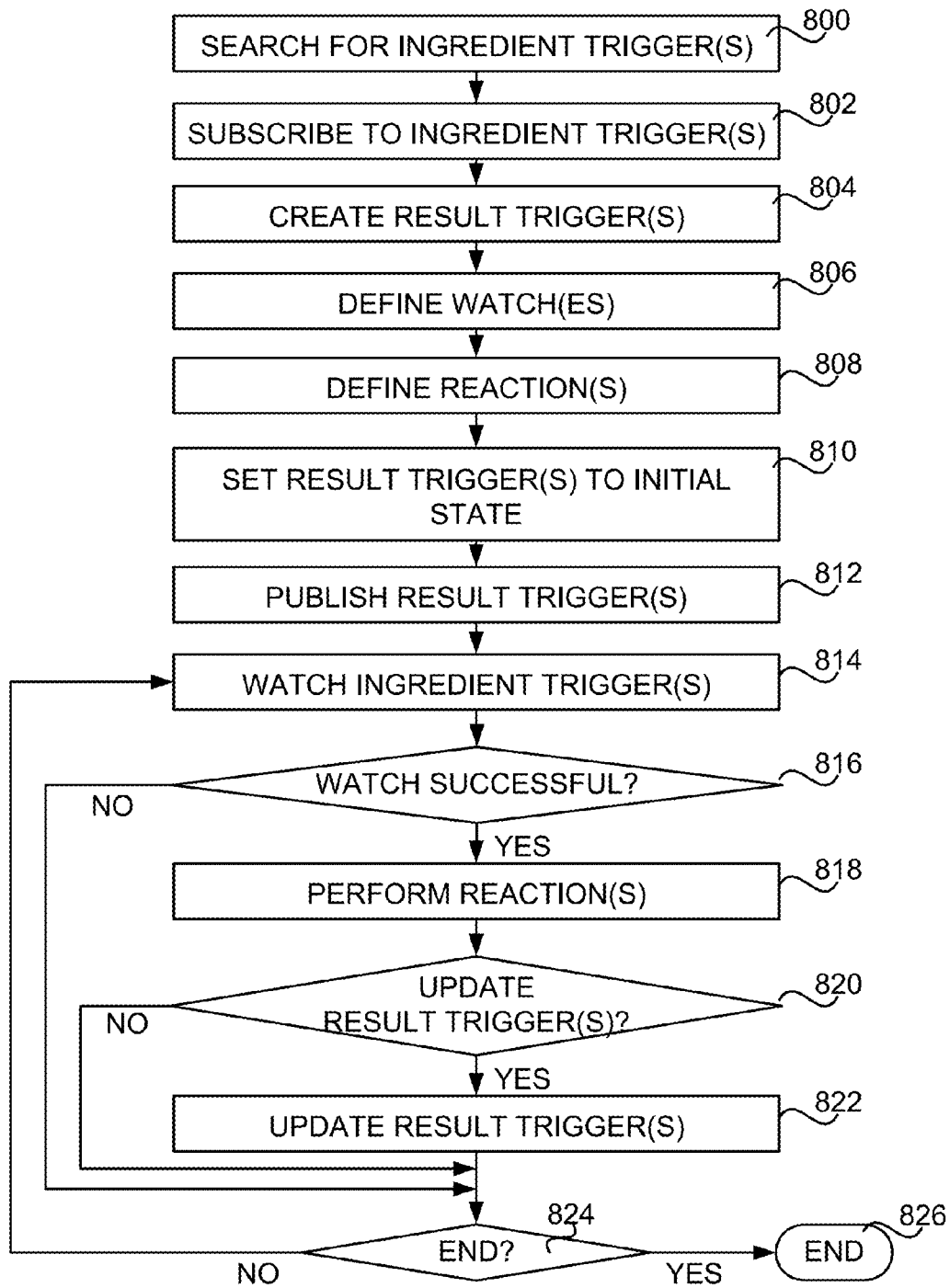
Figure 9:
Figure 10:
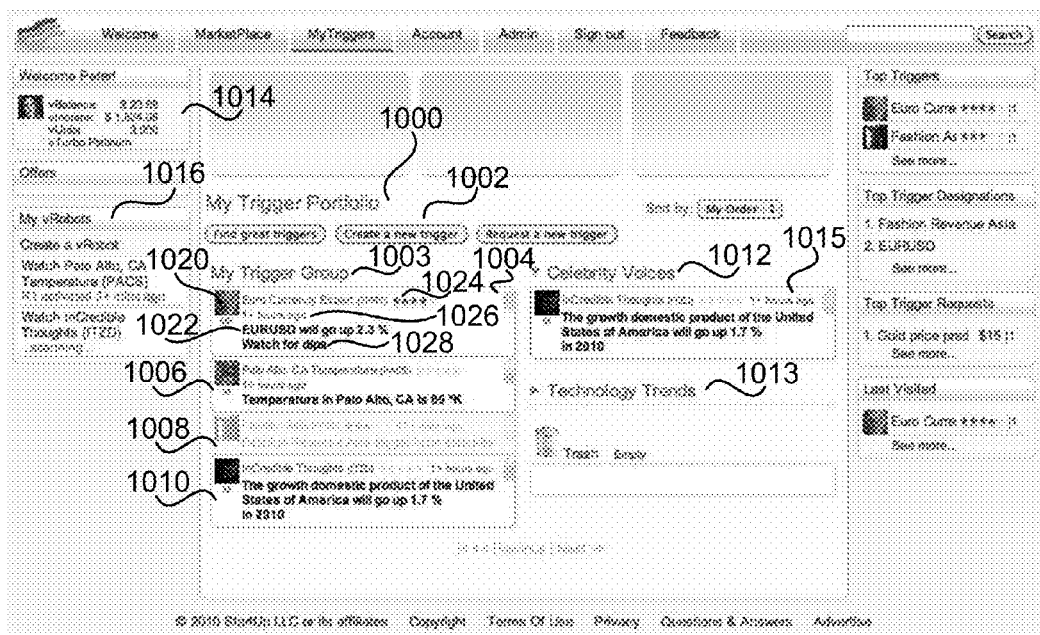
Figure 11:
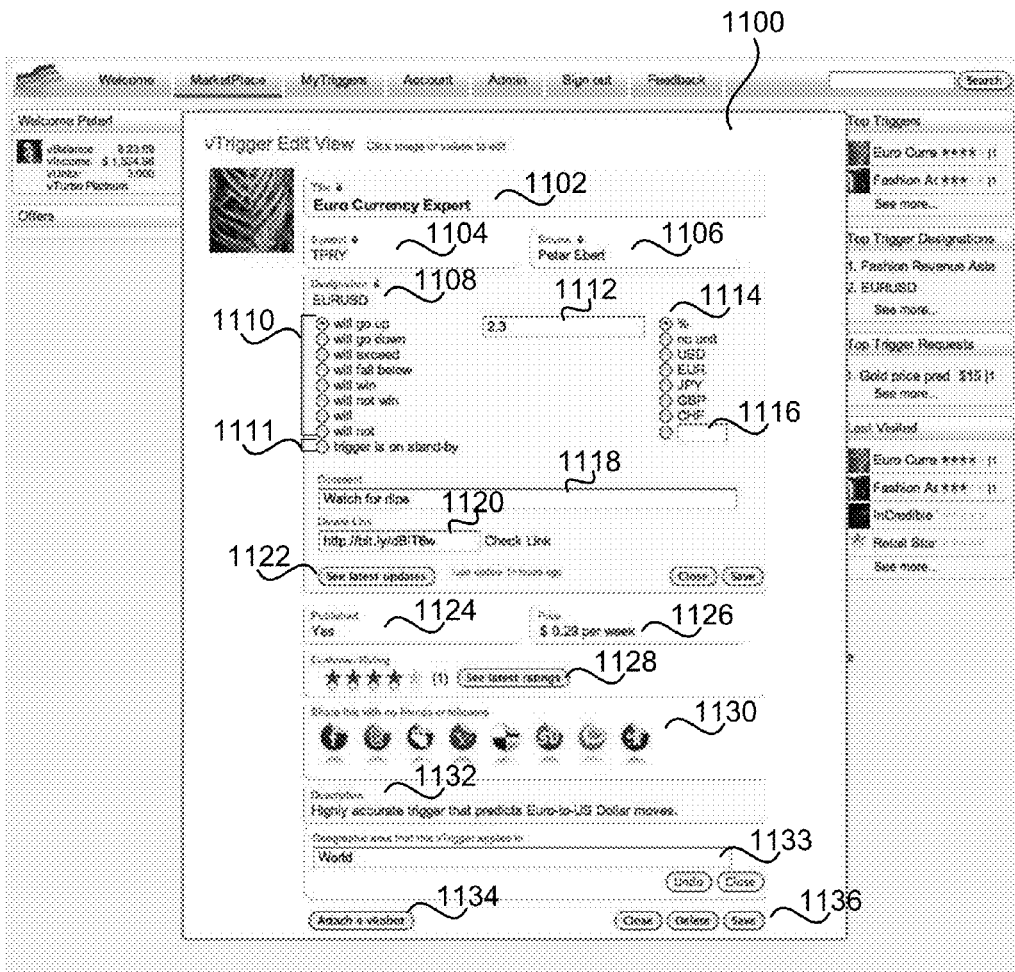
Figure 12:
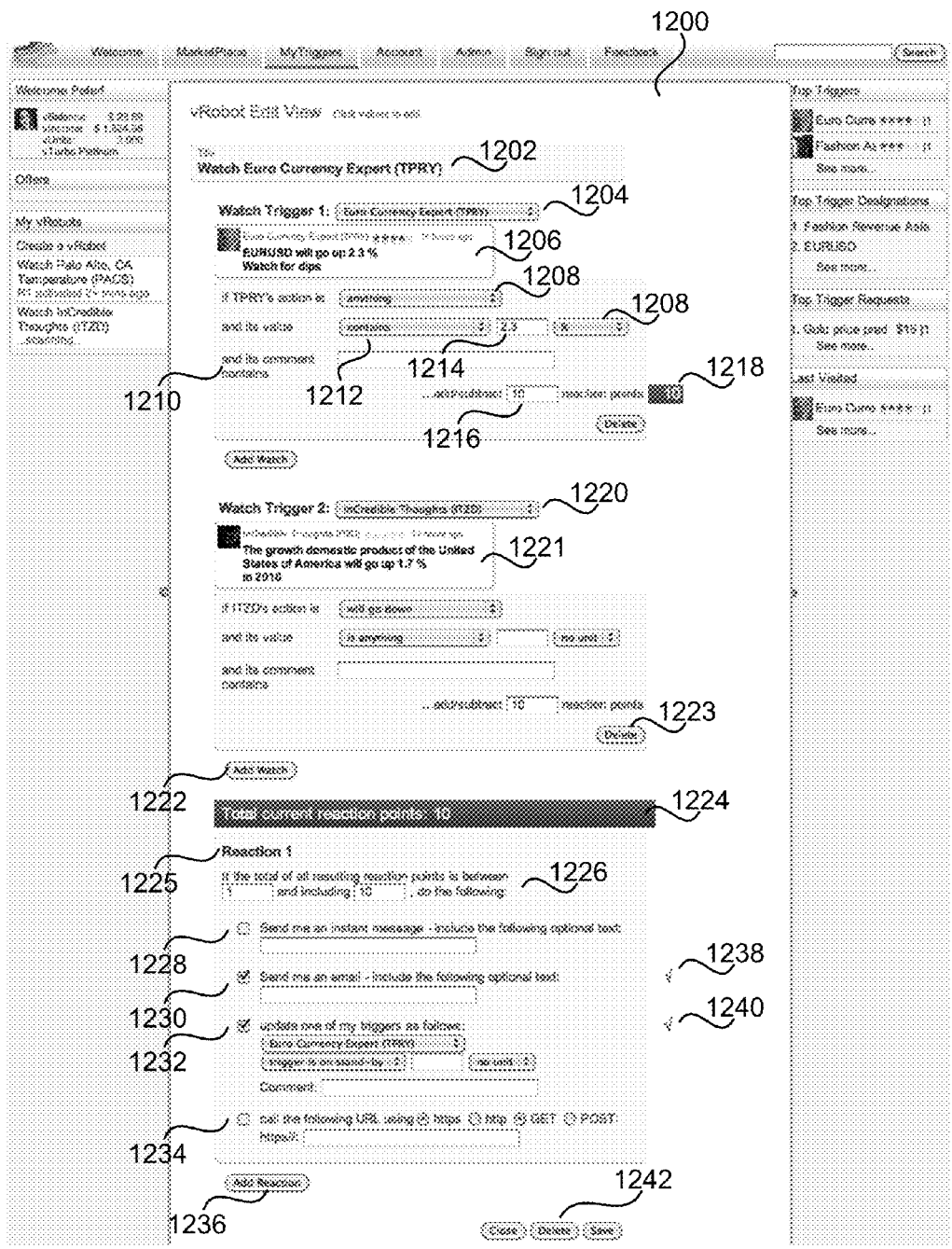
Figure 13:
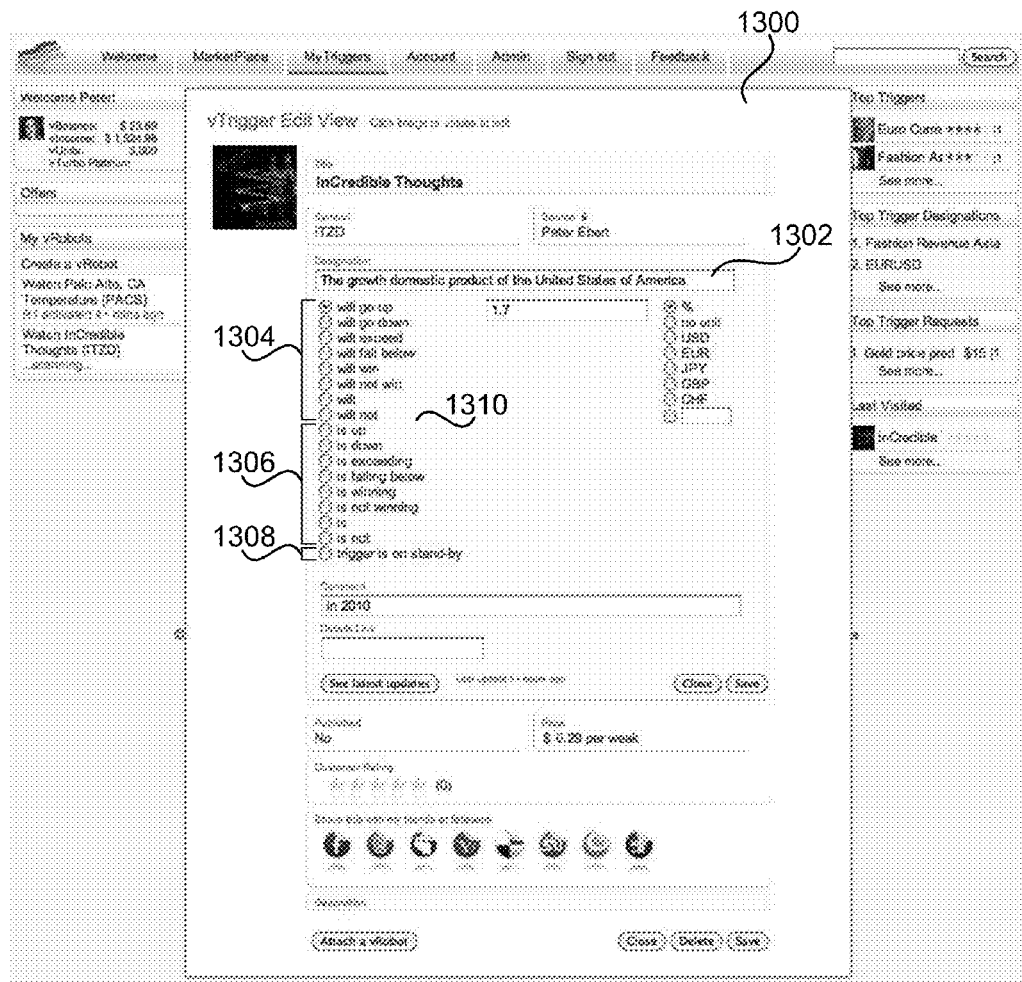
Figure 14:
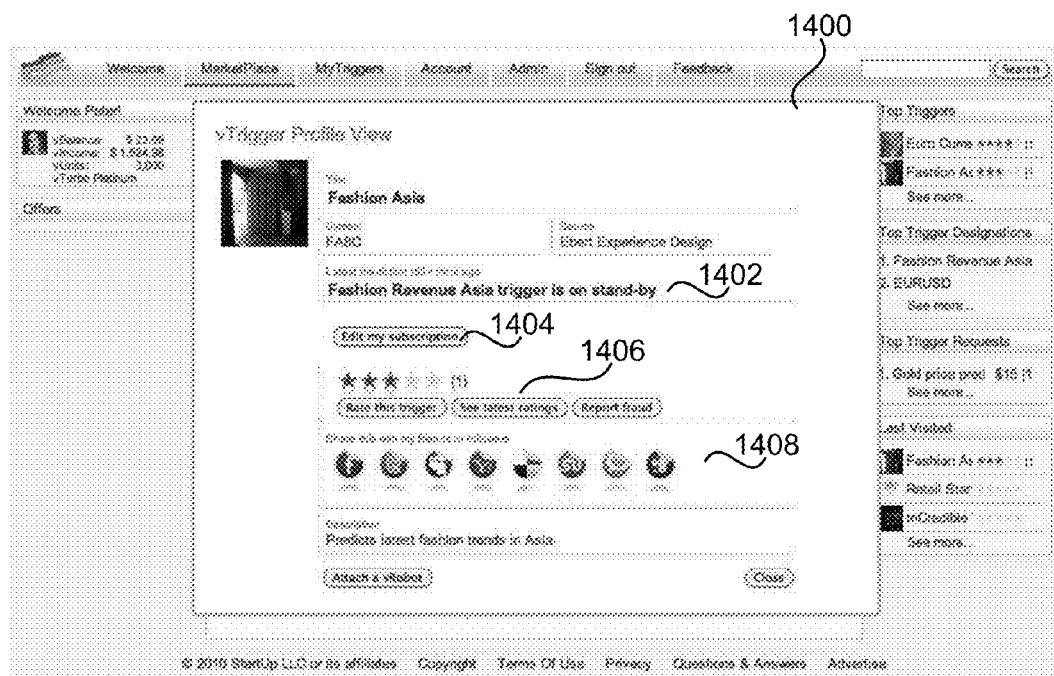
Figure 15:
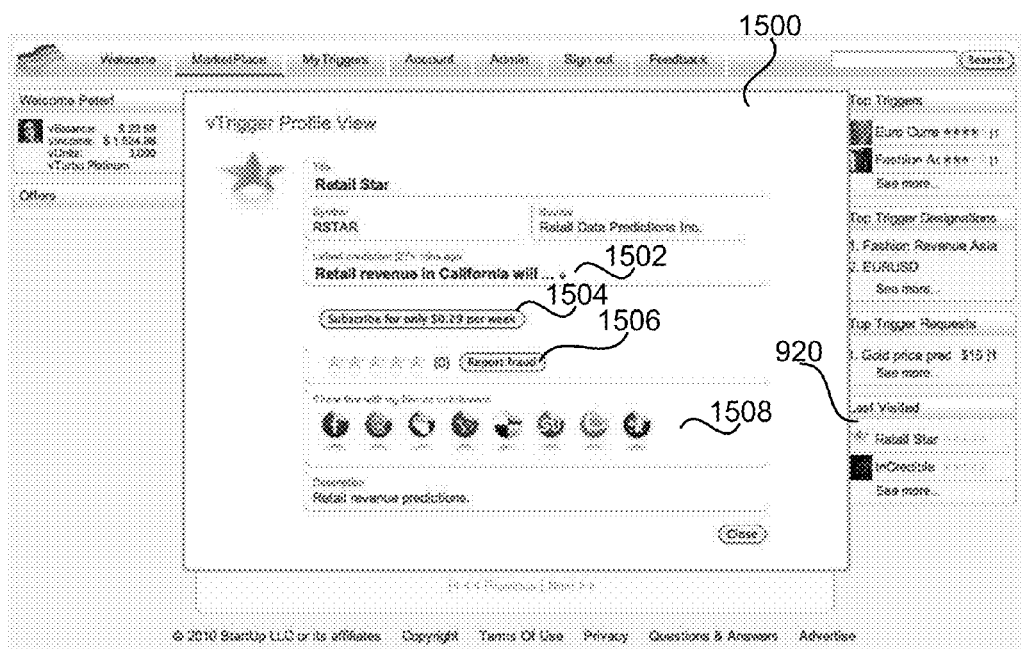
Figure 16:
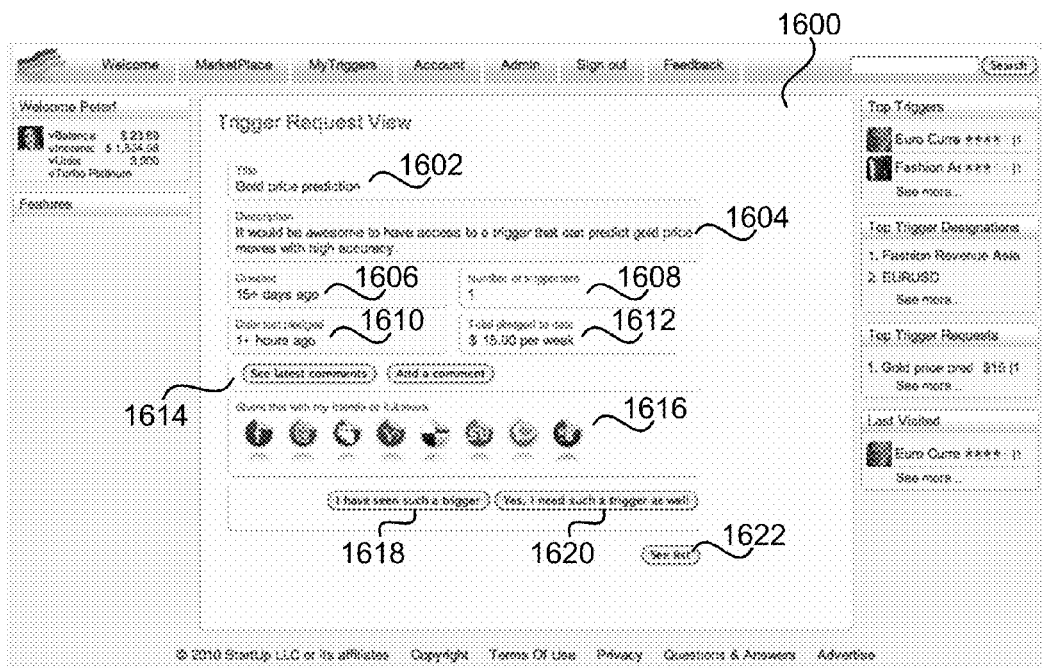
Figure 17:
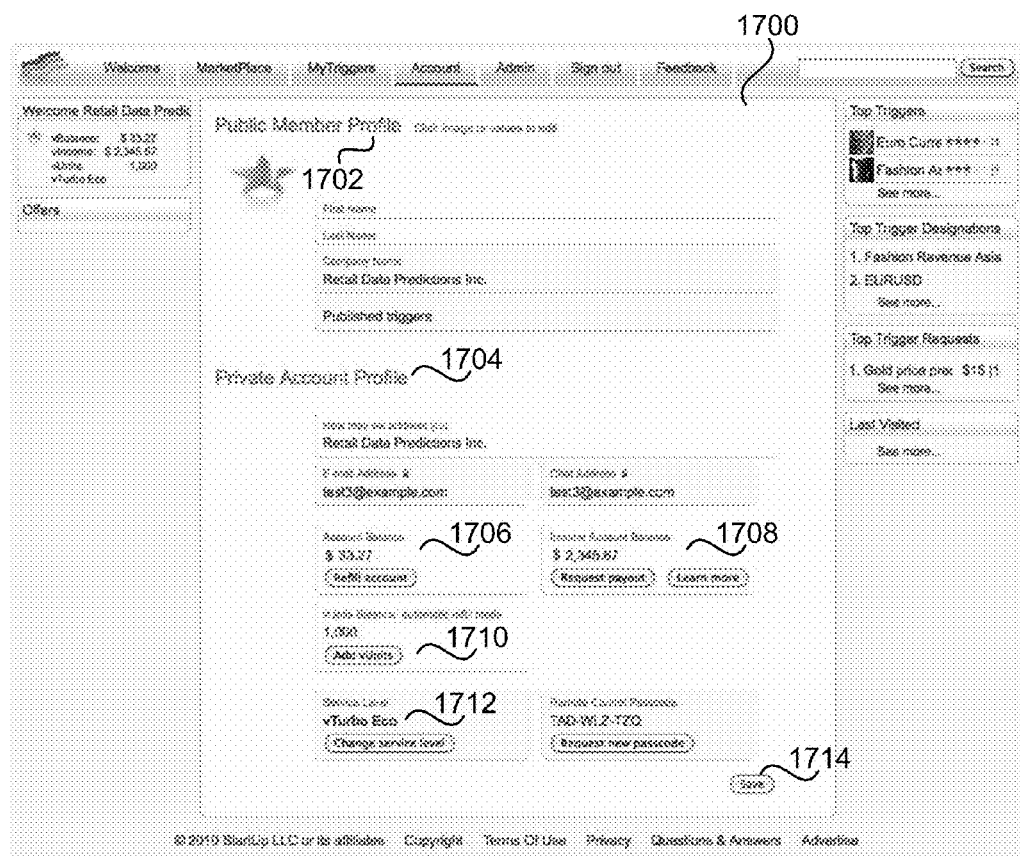
Figure 18:
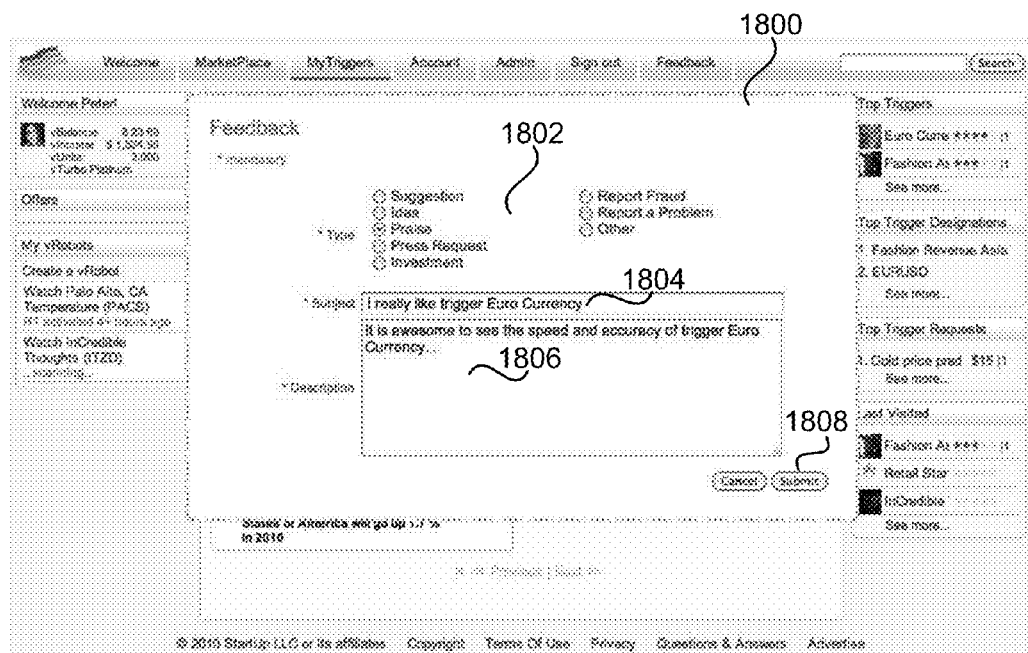
Figure 19:
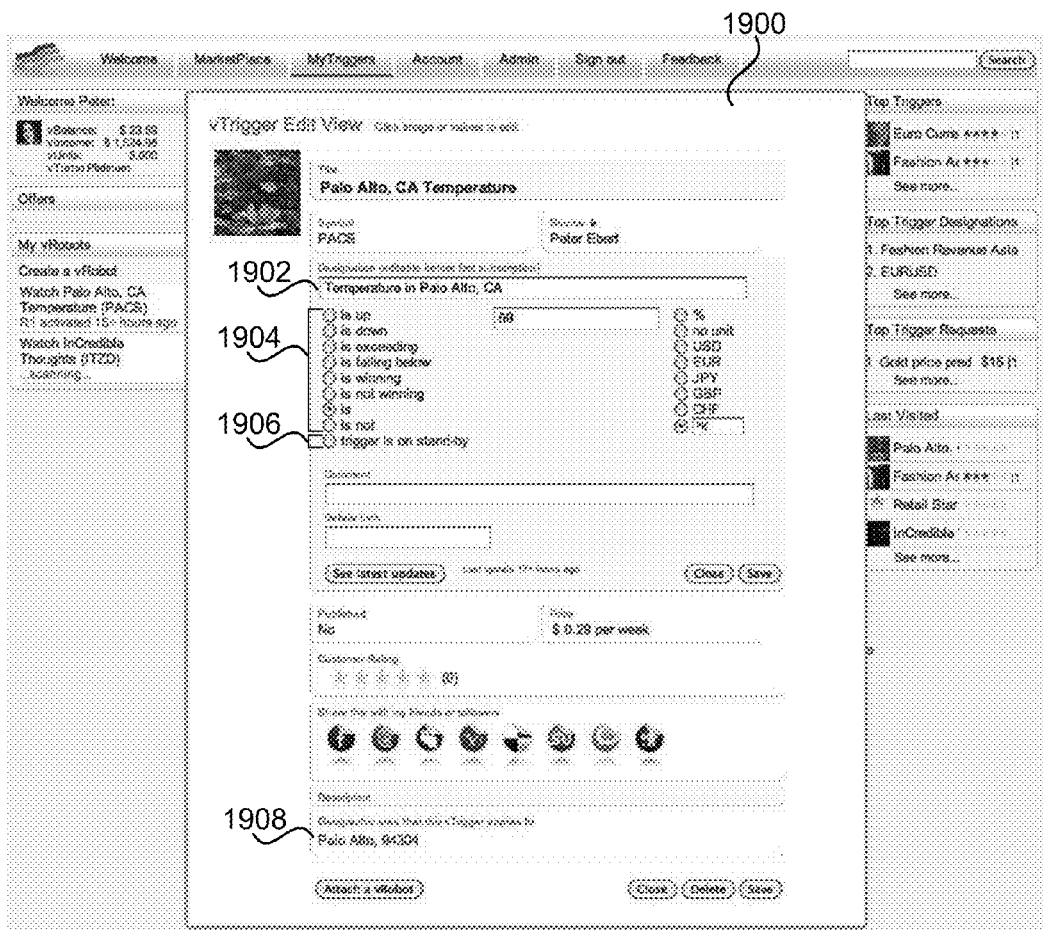
Figure 21:
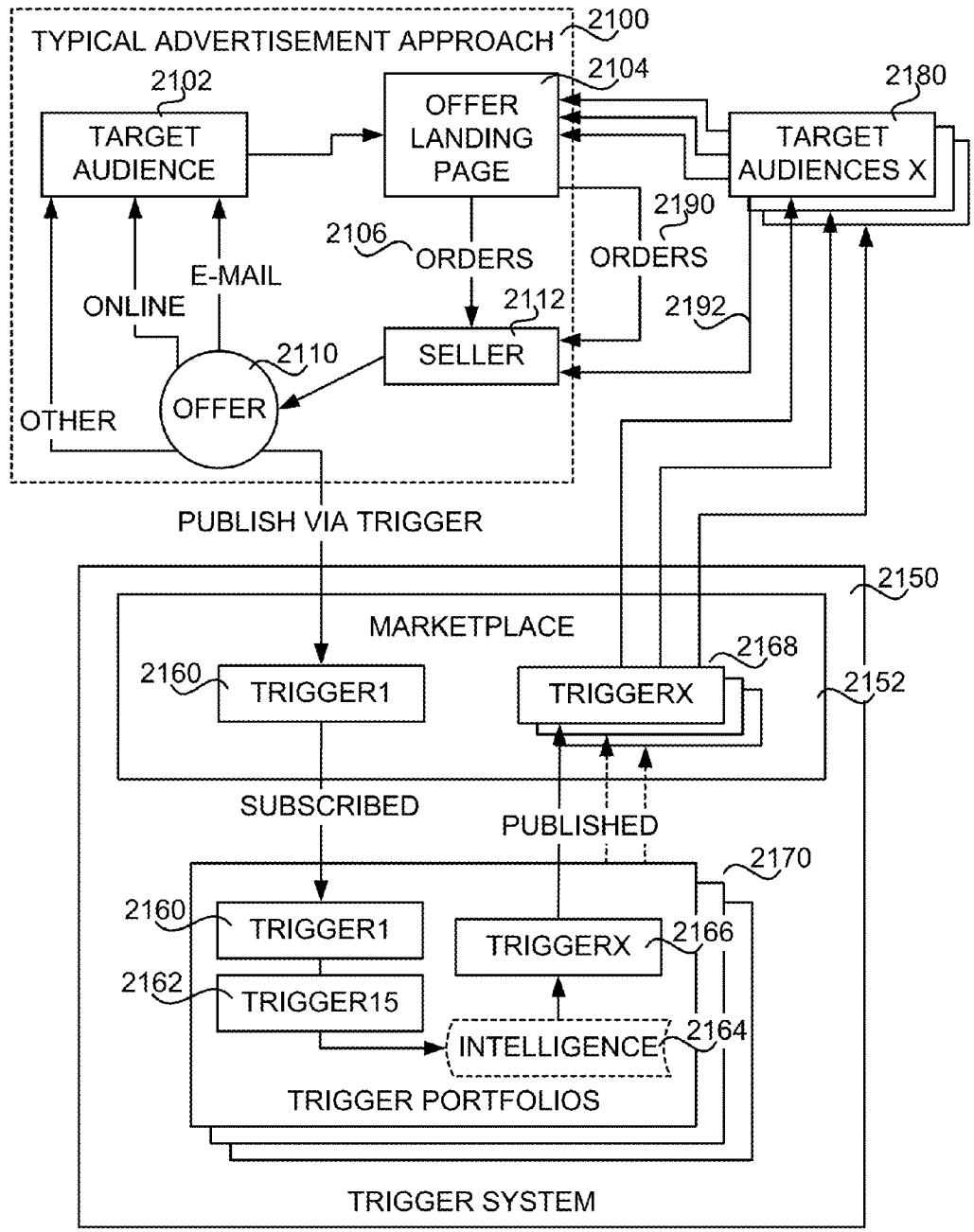
Figure 22:
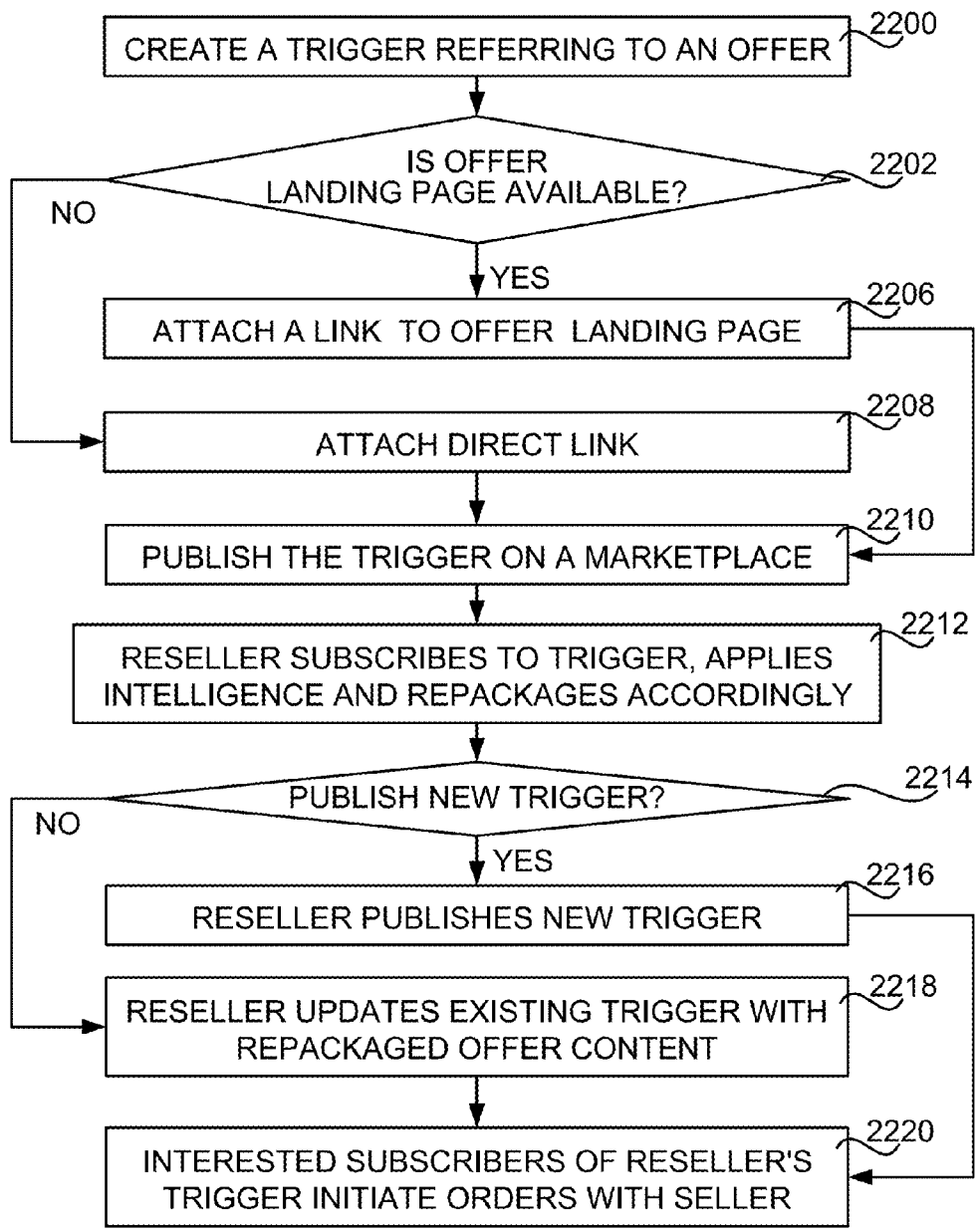
Figure 23:
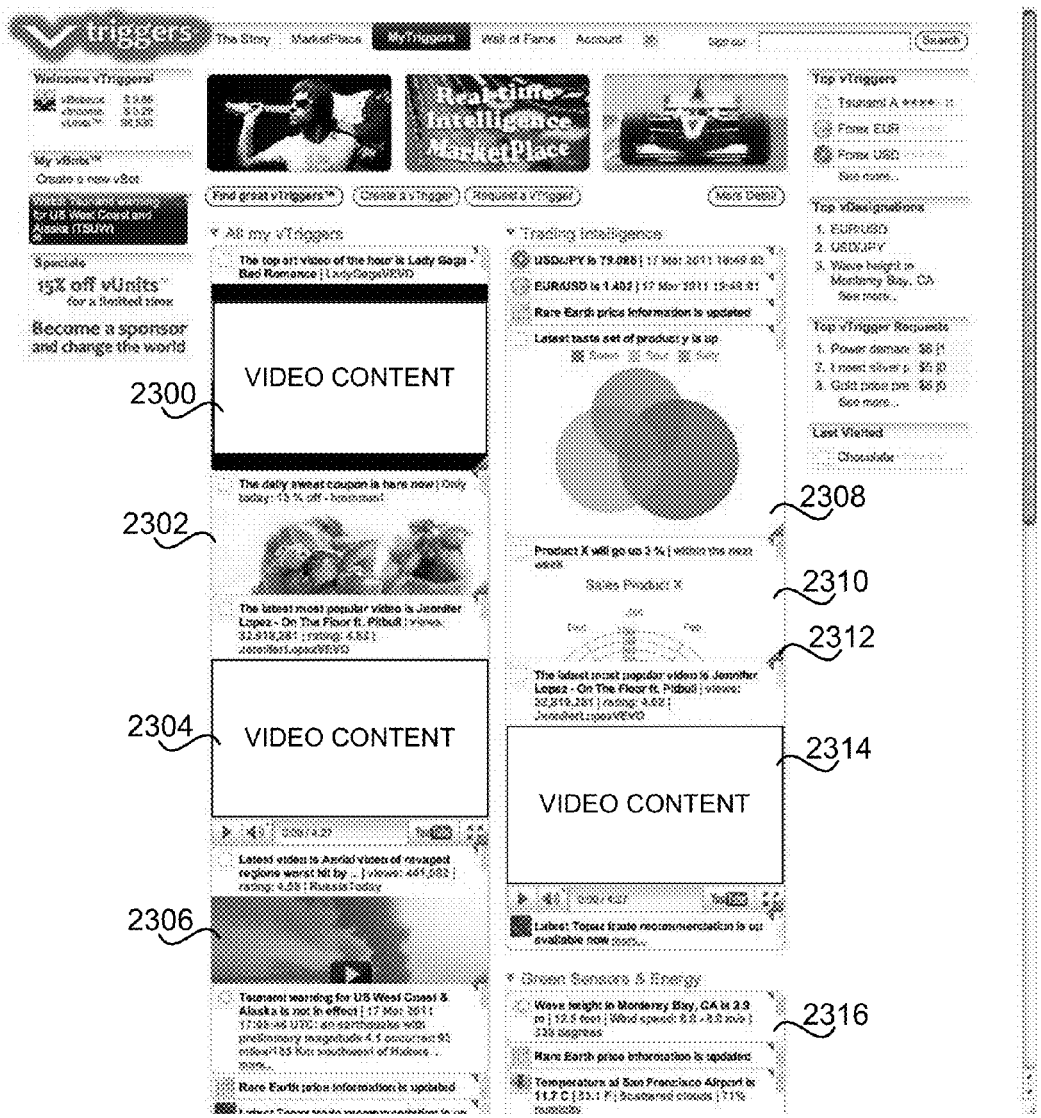

FIG. 1 is a block diagram depicting a trigger.
FIG. 2 is a block diagram depicting a trigger request.
FIG. 3 is a block diagram depicting a robot.
FIG. 4 is a block diagram illustrating a trigger system including an example operation.
FIG. 5 is a flowchart depicting a typical operation using a trigger.
FIG. 6 is a flowchart depicting a typical operation using a trigger request.
FIG. 7 is a flowchart depicting a typical operation of a robot.
FIG. 8 is a flowchart depicting a typical operation of the trigger system.
FIG. 9 is a screen shot of an example implementation of a marketplace in the spirit of the present invention.
FIG. 10 is a screen shot of an example implementation of a trigger portfolio in the spirit of the present invention.
FIG. 11 is a screen shot of an example implementation depicting how to update a predictive trigger.
FIG. 12 is a screen shot of an example implementation depicting how to edit a robot.
FIG. 13 is a screen shot of an example implementation depicting how to update a celebrity trigger.
FIG. 14 is a screen shot of an example implementation depicting how a subscribed trigger may be presented to a subscriber.
FIG. 15 is a screen shot of an example implementation depicting a view of a trigger system participant at a trigger that he is not subscribed to.
FIG. 16 is a screen shot of an example implementation depicting a view of a trigger request.
FIG. 17 is a screen shot of an example implementation depicting a view of a profile of a participant in a trigger system.
FIG. 18 is a screen shot of an example implementation depicting a feedback input by a participant in a trigger system.
FIG. 19 is a screen shot of an example implementation depicting how to update a reporting trigger.
FIG. 20 is a screen shot of an example implementation depicting how to create a trigger in a first step.
FIG. 21 is a block diagram depicting a preferred embodiment of the present invention.
FIG. 22 is a flow chart depicting an operation of the preferred embodiment of FIG. 21.
FIG. 23 is a screen shot of an example implementation depicting images and videos attached to triggers.

DETAILED DESCRIPTION

FIG. 1 is a block diagram depicting the structure of a trigger. In the spirit of the present invention, a trigger is a structured information artifact with various attributes that can be published on an electronic marketplace and subscribed to by one or more participants in the electronic marketplace.

In the following description, the term electronic marketplace shall be referred to as marketplace.

Before being subscribed to, only a subset of a trigger's attributes are made visible to participants in the marketplace as described in more detail below. The invented marketplace and example operation thereof will also be described in detail below.

A trigger represents, for example, a latest status of a fact, a prediction, an insight, a piece of information or the like, such as "The growth domestic product of the United States of America will go up 1.7% in 2010". In the following description, this human readable composite of various pieces of information that are part of a trigger shall be described as "trigger statement". Of course, each piece of information that is part of a trigger may also be written and read directly or in any combination.

The present invention comprises, but is not limited to, the following three types of triggers: 1) predictive triggers, 2) reporting triggers and 3) celebrity triggers. The common features as well as the differences between the disclosed trigger types are described in detail below.

Now referring to FIG. 1, trigger 100 optionally contains a title 102, for example, to brand it and make it easily distinguishable for participants in the marketplace.

In addition, trigger 100 contains a symbol 104, for example "GDPUS". Symbol 104 is a unique identifier that can be used to unambiguously identify trigger 100 at least within a trigger system.

Type 106 indicates the trigger type of trigger 100, typically either predictive, reporting or celebrity, A reporting trigger indicates a fact, measurement, status or piece of information, such as "The current temperature in New York City is 75 degree Fahrenheit".

A predictive triggers indicates a prediction, such as the above example "The growth domestic product of the United States of America will go up 1.7% in 2010".

A celebrity trigger can feature a reporting or predictive trigger statement in order to allow expressing, for example, an opinion, insight, prediction, a fact, a feeling and the like.

Source 108 indicates who owns or controls trigger 100 and can relate, for example, to a person, business entity, device, animal, plant or a composition or group thereof. Typically, a trigger source is a participant in a trigger system.

Designation 110 indicates the key subject that the trigger relates to, such as "The growth domestic product of the USA", "The current temperature in New York City" and the like.

Action 112 indicates the key action or status that the trigger 100 expresses, such as "will go up", or "is". A set of default key actions disclosed as part of the present invention is described in more detail below.

Value 114 indicates a quantitative or qualitative part of the trigger statement of trigger 100, such as "1.7" or "75" or "significantly".

Unit 116 indicates what unit of measurement value 114 is related to, for example "Degree Fahrenheit", "$" or "%".

Value comment 118 may contain an optional comment, for example "Strong winds expected starting at 4 pm EST".

Action 112, value 114, unit 116 and value comment 118 are typically only accessible to subscribers of trigger 100.

Price 120 indicates the fee required to be paid by subscribers in order to be able to access action 112, value 114, unit 116 and value comment 118 of trigger 100. As an example, price 120 may be $0.99 per week.

Published indicator 122 indicates whether trigger 100 is published and thus visible on the marketplace for subscribers, or not.

Last updated indicator 124 indicates when any relevant content of trigger 100 was last changed, typically expressed in the time zone of the trigger system hosting trigger 100. This information may be particularly important for subscribers of trigger 100 to determine how timely trigger 100's latest trigger statement is.

Trigger 100 may also optionally be related to a description 126 that can, for example, be used to educate prospective subscribers of trigger 100 in more detail about its benefits and how and by whom trigger 100 is being updated.

Optionally, trigger 100 may be related to one or more ratings 128. Ratings 128 may be produced and attached by active subscribers and may be used, for example, by prospective subscribers to evaluate prior subscriber satisfaction with trigger 100 and thus help them determine the perceived quality of trigger 100 among prior subscribers.

Optionally, trigger 100 may also be related to one or more comments 130. Comments 130 may typically be produced and attached by active subscribers of trigger 100 and may be used, for example, by prospective subscribers to evaluate prior subscriber satisfaction with trigger 100 and thus help them determine the perceived quality of trigger 100 among prior subscribers.

Additionally, trigger 100 may be related to one or more links 132. The term link shall be used in the spirit of the well-known Uniform Resource Locator (URL) concept used throughout the Internet. Links 132 may typically be attached by the source of the trigger 100, for example to provide subscribers with additional information about trigger 100 or its latest status.

Additionally, trigger 100 may be related to one or more icons 134. An icon may be any visual that can be attached to trigger 100, such as an image, video, interactive graphic and the like.

Additionally, trigger 100 may be related to one or more locations 136. The term location shall be used for describing a position in a physical or imaginary space that a) can be measured and whose co-ordinates can be derived in a particular spatial reference system, for example using latitude and longitude; or b) that can be described in a textual form, e.g. 'San Francisco, Calif.'. Using co-ordinates a) is particularly useful in describing a point location of a trigger, for example, to pin-point the present or past location of trigger 100 on a map or to measure its present or past distance from other triggers or objects. Using a textual location form b) is particularly useful in easily describing areas that may have complex geographical boundaries, for example, to allow textual searching for all triggers that are currently related to locations in San Francisco, Calif. The same approach may be applied to relate triggers to imaginary spaces, such as used in computer games or simulations that use imaginary spaces and respective spatial reference systems.

Now referring to FIG. 2, a trigger request 200 is depicted. A trigger request is an information artifact that can be created and used by a prospective subscriber to request a new trigger within one or more trigger systems. Once the trigger request is created, it is made visible to other potential subscribers within the one or more trigger systems who can then support the trigger request by attaching a respective pledge. Additionally or alternatively, potential subscribers can attach comments to the trigger request, for example to add thoughts. Trigger requests can drive demand on the trigger marketplace helping potential trigger sources to learn about and determine the demand for a particular type of trigger by prospective subscribers. This can be accomplished for example, by considering the number of supporters a trigger request accumulates, its total pledged amount, how fast the number of its supporters and pledges are increasing, which comments are being attached, or any combination thereof.

Title 202 ideally contains a short, descriptive heading for the trigger request 200, for example, as depicted in the implementation example further below.

Description 204 ideally contains a detailed description of the requested trigger.

Total pledged 206 indicates the sum of all pledges received for trigger request 200 to date.

Number of supporters 208 indicates the total number of supporters of trigger request 200 to date.

Date created 210 indicates the date and time when trigger request 200 was created, for example for potential trigger sources to determine how up-to-date trigger request 200 is or how quickly it gained support.

Date last pledged 212 indicates when the latest pledge was received for trigger 212.

Comment(s) 214 indicates comments that were attached to the trigger request 200 to date.

Now referring to FIG. 3, a robot 300 is depicted. In the spirit of the present invention, a robot is an executable information artifact that can at least be used to watch one or more triggers and perform one or more reactions upon detecting a predefined state of its one or more watched triggers.

Optional title 302 ideally contains a short, descriptive sentence describing the purpose of the robot 300.

Optional description 304 ideally contains a more detailed description of the robot 300, for example explaining the broader strategy that robot 300 shall help to accomplish and the like.

One or more watch(es) 306 indicate which attributes of one or more triggers the robot 300 shall watch and in which one or more cases it shall perform one or more of its defined reaction(s) 308.

One or more reaction(s) 308 may comprise, but not be limited to, one or more of, sending an alert via e-mail, sending an alert via instant messaging, updating a trigger in a predetermined way, and at least one of: consuming data via at least one particular URL, delivering data to at least one particular URL.

Status 310 indicates the current status of the robot 300, for example to distinguish between a paused state, an actively watching state or an issue state.

Referring now to FIG. 4, a preferred embodiment of the present invention is shown illustrating a trigger system 470 according to, and in the spirit of, the present invention.

Trigger system 470 comprises one or more marketplaces 400, and a multitude of trigger portfolios such as the depicted trigger portfolio 420. Each marketplace 400 may be publicly or privately accessible. Privately accessible shall mean only accessible to a specific group of one or more participants of the trigger system 470. Publically accessible shall mean accessible to anybody or anything that can access trigger system 470, ideally via the Internet (not shown).

Trigger system 470 comprises application programming interfaces (APIs) 450 and 452 that can be accessed from outside trigger system 470 ideally via the Internet (not shown). Of course, trigger system 470 may comprise additional APIs (not shown).

Marketplace 400 comprises four triggers 402, 404, 406 and 410. In addition, marketplace 400 contains one trigger request 408. Of course, this is only an example and marketplace 400 may contain a multitude of triggers and trigger requests.

Trigger portfolio 420 depicts a personal trigger area of a particular participant x (not shown) of the trigger system 470. In the presented example, participant x has subscribed to trigger 406 thus seeing a copy of trigger 406 in his personal trigger area, here numbered 422. Trigger copy 422 is updated whenever any attribute of trigger 406 is updated and exposes the same attributes as trigger 406. Trigger 406 is controlled and updated by its trigger source, that is another participant y (not shown) of trigger system 470. Trigger copy 422 can also be understood as a representation or projection of trigger 422 that is updated whenever trigger 422 is updated.

It is a key aspect of the present invention to enable participants of the trigger system 470 to propagate trigger updates to other participants of the trigger system 470 with as little delay as possible, ideally in real-time or near real-time.

In addition, trigger portfolio 420 contains two triggers 424 and 428 that are both owned by the participant x. In this example, trigger 428 is periodically updated via the Internet and via API 452 by a mobile device (not shown) owned by participant x (not shown).

In addition, trigger portfolio 420 is assigned a robot 426 that is set by participant x to watch the triggers 422 and 428. Watch 430 defines which one or more attributes of trigger 422 robot 426 is to watch, whereas watch 432 defines which one or more attributes of trigger 428 robot 426 is to watch.

Once robot 426 detects a match according to either watch 430 or watch 432, it performs a reaction 434 that was defined by participant x to update trigger 424 in a particular way. Trigger 424 is published as trigger copy 410 on the marketplace 400 and thus can be subscribed to by other participants that have access to marketplace 400. Subscribers of trigger 410 can access its trigger statement and attribute updates performed by robot 426 and can in turn run one or more own robots (not shown) in their one or more own trigger portfolios (not shown) performing their one or more own desired reactions (not shown) as they wish.

The depicted ability for participants to have actions performed in a standardized way based on the status of one or more own and/or subscribed triggers is a key advantage and embodiment of the present invention.

Participant x may also access the status of triggers in his portfolio 420 via API 450, for example, to have a software application outside of the trigger system 470 track his subscribed triggers and perform respective reactions that may include updating trigger 428 via API 452.

Resource meter 454 may measure the rate at which individual participants in the trigger system, their robots, or any of their delegates are using, for example, processing power, communication network bandwidth, messaging services such as e-mail or instant messaging, or any combination thereof within the trigger system. The resulting usage data may be used, for example, for billing participants accordingly.

In a preferred embodiment of the present invention, the depicted trigger system 470 shall provide means to propagate status changes within the trigger system with as little a delay as possible. This shall mean, for example, that at least each time a trigger is updated, subscribers of that trigger as well as robots watching the updated trigger may be notified of the update in real-time or near real-time.

Furthermore, resulting actions of the subscribers or robots, such as updating respective triggers in respective reactions, may also be performed in real-time or near real-time. This may be accomplished, for example, by applying a real-time publish-and-subscribe event-based technology or any other technology operable to achieve as little delay as possible between the time when a status within the trigger system changes and the time this status change is being communicated to participants in the trigger system.

It is an additional aspect of the present invention to allow deploying more than one robot with the same watch definitions in various execution environments, for example in order to minimize delays between an update of a watched trigger and the detection of the update by the one or more robots.

As an example of this approach, robot 426 with watches 430 and 432 may be run on a backend processing infrastructure of trigger system 470. In parallel, at least one of the watches 430 and 432 may be performed by at least one more robot. This one or more robots may, for example, be run within a web client used by a participant of the trigger system, for example, using the well known scripting language JavaScript, or be run within any other processing environment operable for this purpose.

Upon detecting a fulfillment of either watch 430 or watch 432, each such deployed robots may try initiating the reaction 434 with a mechanism in place that only allows the first robot to successfully perform the reaction 434.

It is an additional aspect of the present invention to allow one or more dashboards 480 to comprise one or more triggers or trigger copies, for example, the triggers 402 and 406. Furthermore, one or more of the dashboards 480 may be part of marketplace 400 and offered for subscription on marketplace 400. Additionally or alternatively, one or more of the dashboards 480 may be part of the one or more trigger portfolios 420. Additionally or alternatively, one or more of the dashboards 480 may be hosted outside of the trigger system 470 and comprised trigger copies may be updated via one or more data network connections. Additionally or alternatively, one or more of the dashboards 480 may not only comprise triggers or trigger copies, but also other content, such as conventional charts, images, textual information and the like.

Now referring to FIG. 5, a typical operation of a trigger is depicted.

In step 500, a trigger is created within a trigger system by a trigger source. This may, for example, be accomplished via a user interface accessible via the Internet, via an API, or any other means operable to initiate creating a trigger. Since the newly created trigger is not published yet, the trigger is not visible on a trigger marketplace yet.

In step 502, the trigger source sets a subscription price for the trigger and publishes the trigger in step 504. At this point, the trigger appears on at least one trigger marketplace within one or more trigger systems. Of course, the subscription price may be set to zero, meaning that subscribers may not need to pay for accessing the trigger.

In step 506, if the trigger source or a delegate determines that the trigger shall be updated, it is updated in step 508. Updating the trigger typically includes changing and persisting at least one of, its designation, action, value, unit and value comment. However, it may additionally or alternatively include changing one or more of the trigger's other attributes, for example, its price, title, links or the like. In step 506, if the trigger shall not be updated, step 508 is skipped and step 510 is performed directly.

In step 510, if the trigger was subscribed by at least one subscriber, in step 512, all subscribed copies of the trigger are updated, preferably automatically by the trigger system upon detecting the original update of the trigger in step 508. Prior to performing the update of subscribed trigger copies, the trigger system may, for example, check the validity of each subscription.

Additionally or alternatively, for example, each subscriber may be debited with a prorated part of the trigger's subscription price and the trigger source may be credited with the resulting proceeds minus any applicable commission fees. Alternatively, at least a subset of subscribers may pay the trigger's subscription price in advance for a particular subscription time period at the start time of the subscription.

In case the trigger subscription price was set to zero in step 502, no payment by subscribers of the trigger may be necessary.

Of course, a multitude of alternative or additional subscription or other fee payment models can be applied and the invention is not limited to a specific subscription or fee model or process.

In step 510, if the trigger does not have at least one subscriber, step 512 is skipped and step 514 is performed directly.

In step 514, if the trigger shall be deleted, for example because it is obsolete, it is deleted in step 516. In this case, the trigger will not be available for subscription on a marketplace anymore and will typically become invisible at least within the trigger system it was created in.

In step 514, if the trigger shall not be deleted, step 506 is performed as described above.

Now referring to FIG. 6, a typical operation of a trigger request is depicted.

In step 600, a participant in a trigger system creates a trigger request within the trigger system and pledges a prospective subscription price, for example, "$3.00 per week" in step 602. The pledged subscription price can be used, for example, by prospective trigger sources to determine how valuable the requested trigger would be to the creator of the trigger request.

In step 604, the creator of the trigger request publishes the trigger request, which makes the trigger request visible at least within the trigger system it was created in.

In step 606, if the trigger request is supported by at least one supporter, the trigger request is updated accordingly in step 608. In this case, at least the number of supporters, the date last pledged, and the total pledged attributes of the trigger request are computed and updated accordingly. For example, if one supporter pledges "$4.00 per week", the total pledged attribute of the trigger request would be updated with $3.00 per week by the creator plus $4.00 per week by the one supporter=$7.00 per week. This allows other participants in the trigger system to quickly and easily determine the accumulated demand for the requested trigger.

In step 606, if the trigger request is not supported by at least one supporter, step 608 is skipped and step 610 is performed directly.

In step 610, if at least one participant in the trigger system indicates having seen a trigger similar to the requested trigger somewhere in a trigger system, a comment is attached to the trigger request in step 612 reflecting this information.

Additionally, a message may be sent by the trigger system ideally to the requestor as well as to all supporters of the trigger request, notifying them of the attached "seen" comment.

In step 610, if a trigger similar to the requested trigger has not been seen somewhere in a trigger system yet, step 612 is skipped and step 614 is performed directly.

In step 614, if the trigger request shall be deleted, for example because another already existing sufficiently similar trigger was found, or a trigger source created the requested trigger based on the trigger request, the trigger request is deleted in step 616.

In step 614, if the trigger request shall not be deleted, step 606 is performed as described above.

Now referring to FIG. 7, a typical operation of a robot in the spirit of the present invention is depicted.

In step 700, a robot is created within a trigger system, typically by a subscriber of at least one trigger published within the trigger system. Of course, a robot may also be created for the subscriber, for example, by a third party service provider.

In step 702, the creator of the robot defines at least one watch of the robot. A watch typically targets one trigger that is subscribed to by the robot creator. Furthermore, the watch defines which state or value a particular attribute of the target trigger will need to have in order for the watch to be become successful. For example, a watch may be defined to become successful if the current value of a trigger exceeds a particular number, or if the current or predicted location of a trigger is or will be within a particular local area.

In step 704, the creator of the robot defines at least one reaction of the robot. A reaction typically defines at least one particular action including, but no limited to, sending an e-mail, sending an instant message, updating a trigger, and calling an API or posting data to an API.

In step 706, if the robot shall start performing its at least one defined watches, step 708 is performed computing whether at least one of the robot's watches are successful. Step 708 is typically repeated whenever at least one watched trigger is updated.

In step 706, if no watch shall be performed, step 706 is repeated.

In step 710, if at least one of the robot's watches is successful, all of the robot's respective reactions are performed in step 712. In step 714, if the performing of the one or more defined watches of the robot shall be stopped, step 716 is executed, stopping the watches.

In step 710, if no watch was successful, step 712 is skipped and step 714 is performed.

In step 714, if the performing of the robot's watches shall not be stopped, step 708 will be repeated.

Now referring to FIG. 8, a typical operation of the trigger system in the spirit of the present invention is depicted.

In step 800, a participant in the trigger system searches for ingredient triggers. The term ingredient trigger shall be used based on the presently disclosed approach that more than one trigger may be watched by a subscriber or one or more of his robots in order to detect a particular status within a trigger system, for example, in order to detect an opportunity to perform a particular action such as buying stock, buying or selling a product, a service and the like.

In step 802, the participant subscribes to one or more desired ingredient triggers in order to gain access to these triggers' status whenever updated.

In step 804 the participant creates one or more result triggers that shall be updated by his one or more robots when at least one of the robots' watches is successful. In this example, it shall be assumed that the participant has already created one robot.

In step 806 the participant defines the desired watches of this robot as described above.

In step 808 the participant defines the desired reaction of this robot as described above.

In step 810 the participant sets each of the created result triggers to a desired initial state.

In step 812, the participant publishes the result triggers and has the robot start the defined watches of the ingredient triggers in step 814.

In step 816, if at least one of the watches is successful, the respective defined reactions are performed in step 818.

In step 820, if the respective reaction(s) contain updating at least one of the created result triggers, the respective result trigger(s) are updated in step 822.

In step 824, if the participant wants his robot to end its watches, step 826 is performed, ending performing the robot's watches.

In step 816, if no watch was successful, step 824 is performed.

In step 820, if no result trigger(s) shall be updated, step 824 is performed.

In step 824, if the watches shall be continued, step 814 is performed.

Now referring to FIG. 9, a screen shot of an example implementation of a trigger marketplace in the spirit of the present invention is depicted.

Marketplace 902 allows a participant in a trigger system to browse for available published triggers and to subscribe to desired triggers.

Search function 920 allows for a keyword-based search within the trigger system, for example, to find triggers with particular attributes. Of course, other trigger discovery methods may be available.

Top triggers area 910 shows the currently top x published triggers within the trigger system, for example ranked based on best ratings, most number of subscriptions or any combination thereof. This area can be used, for example, by prospective subscribers to determine which triggers currently may provide the best value to them.

Top trigger designations area 912 shows the currently top y trigger designations within the trigger system, for example ranked based on highest number of subscriptions of triggers using the respective designation, fastest subscription growth of triggers using the respective designation, or any combination thereof. This area can be used, for example, by prospective trigger sources to determine which triggers they should best offer on the marketplace in order to gain highest possible subscription income.

Top trigger requests area 914 shows the currently top z trigger requests within the trigger system, for example ranked based on each trigger request's highest number of supporters, highest total pledges, fastest growing number of either supporters or pledges, or any combination thereof. This area can be used, for example, by prospective trigger sources to determine which triggers they should best offer on the trigger marketplace in order to gain highest possible subscription income.

In this simplified example, marketplace 902 currently contains three triggers 904, 906 and 908. Of course, marketplace 902 may contain a multitude of triggers as well as showing trigger group areas (not shown) for specific types of triggers, such as celebrity triggers, predictive triggers and the like.

In this simplified example, FIG. 9 shows the view of a fictitious participant called 'Peter' being signed into the trigger system looking at the marketplace 902.

As depicted in account overview area 900, Peter currently has an account balance of $23.69, an income account balance of $1,524.98, 3,000 vUnits and a subscription to the VTurbo Platinum' plan.

Peter's account balance reflects the $ credit that Peter currently has within the trigger system, for example, to buy trigger subscriptions, buy additional vUnits, renew his subscription plan, or buy any other provided services.

Peter's income balance reflects the $ credit that Peter currently has within the trigger system stemming from, for example, subscription fees paid by other participants in the trigger system for access to one or more of Peter's triggers.

Peter's vUnits balance relates to the credit that Peter currently has regarding the state of a measured indicator called vUnits. Very much like electricity usage, whenever Peter is using services within the trigger system, vUnits are being measured by a resource meter within the trigger system as described above and deducted from Peter's vUnits account according to a defined rate. This rate may be related, for example, to the amount of processing power used by Peter, his robots or any other of Peter's delegates within the trigger system, for example, to perform trigger updates, use APIs and the like.

As trigger 904 is subscribed by Peter, the trigger's latest trigger statement 905 is shown.

As trigger 906 is not subscribed by Peter, he is presented with an option to subscribe to trigger 906 and trigger 906's trigger statement is not shown.

Trigger 908 is one of Peter's own triggers, which allows him to update the status of trigger 908 as described in more detail below.

Last visited area 916 lists the last x triggers that were clicked on by Peter with the latest clicked trigger or trigger request on top. This area may help participants to easily go back to an earlier clicked trigger or trigger request without the need to memorize its title or icon.

FIG. 10 shows a screen shot of an example implementation of a trigger portfolio in the spirit of the present invention. By way of example, we are looking at a trigger portfolio 1000 of Peter's, as indicated by account overview area 1014. On top of the trigger portfolio 1000 is an area 1002 allowing, for example, to create a new trigger and request a new trigger.

By default, "My Trigger Group" 1003 contains all of Peter's currently owned and subscribed triggers 1004, 1006, 1008 and 1010.

Peter created a trigger group 1012 entitled "Celebrity Voices" and a trigger group 1013 entitled "Technology Trends" for grouping particular triggers in a customized way. "Celebrity Voices" trigger group 1012 contains a copy of trigger 1010, here referred to as trigger 1015 that is simultaneously updated whenever trigger 1010 is updated. Peter created the copy 1015 by dragging and dropping trigger 1010 from trigger group 1003 onto trigger group 1012.

In the depicted example, each customized trigger group 1012 and 1013 can contain zero or more trigger copies. Each contained trigger copy can only occur once in every customized trigger group and can only stem from any of Peter's owned or subscribed triggers. So, as soon as Peter creates a new trigger or subscribes to a new trigger, a copy of this trigger will appear in Peter's trigger portfolio "My Trigger Group" 1003 and can then be copied once into every customized trigger group, here 1012 and 1013. Each copy of a trigger is updated whenever its original trigger is updated.

Also, as soon as Peter ends a trigger subscription or deletes an owned trigger, all copies of this trigger in all trigger groups of Peter's trigger portfolio will be removed as well.

In addition, as depicted, trigger 1008 is currently visually dimmed in order to indicate that it is currently on stand-by, while each of the triggers 1004, 1006, 1010 and copy 1015 of trigger 1010 are not on stand-by but rather showing an updated trigger statement.

Now focusing on trigger 1004 in order to describe the depicted trigger layout in more detail, 1020 depicts an icon, for example, to brand and distinguish trigger 1004.

1022 depicts trigger 1004's current trigger statement including 1028 trigger 1004's current comment.

1024 depicts trigger 1004's title, symbol and current rating.

1026 depicts a simplified, relative time expression, relating to the last time at which trigger 1004 was updated relative to the current trigger system time. 1026 is periodically updated, for example every five seconds.

Of course, while this user interface approach is an embodiment of the present invention, the present invention is not limited to this user interface approach and there may be additional or alternative ways to display or customize a trigger portfolio.

FIG. 11 is a screen shot of an example implementation depicting how to update a predictive trigger. Trigger 1100, a published and subscribed predictive trigger, is being edited.

Title 1102 cannot be edited in this case, as the trigger 1100 is published as indicated in field 1124 and there is at least one active subscriber.

Symbol 1104 and Designation 1108 cannot be edited at this time for the same reason explained above.

Trigger source 1106 cannot be edited upon creation of the trigger 1100 in order to make sure that subscribers can depend on the same trigger source keeping responsibility for the trigger throughout their subscription.

Action update selection area 1110 allows selecting one of the default selections offered for a predictive trigger. While there may be additional or alternative trigger action selections for predictive triggers, it is a key aspect of the present invention to provide the depicted default selections for predictive triggers in order to provide a general standard throughout a trigger system that can be depended upon by participants. This can be particularly beneficial, for example, in order to enable participants across various languages to easily define robots or external software that can analyze and process trigger updates in a clearly defined way.

While action selection area 1110 is specific to predictive triggers, selection area 1111 can also be selected and is universal across trigger types.

Value entry area 1112 allows inputting a value, for example, such as a number or textual expression.

Unit entry area 1114 allows selecting from a set of standard units that apply across trigger types, or, if needed, inputting a unit that is not part of the available universal units, such as "Kilometers" and "kg", for example. Of course, a trigger system may present additional or alternative default unit selections, for example, based on a statistical assessment of units most used by participants.

Comment area 1118 allows inputting a comment.

Link area 1120 allows inputting a URL.

Button 1122 allows to request a list (not shown) of prior latest updates of trigger 1100.

Published area 1124 allows to publish or unpublish trigger 1100.

Price area 1126 allows setting a subscription fee that has to be paid by subscribers in order to be able to access trigger 1100's trigger statements.

Rating area 1128 allows assessing the current accumulated rating of trigger 1100 by all its subscribers, as well as requesting a list of each rating that trigger 1100 received including optional comments. In this example, rating area 1128 can only be read as owners of triggers shall not be enabled to rate their own triggers.

Sharing area 1130 allows sharing a link to a public view of trigger 1100 (not shown) as well as sharing comments with connected friends or other acquaintances via one or more social networks, for example, in order to promote the trigger.

Description area 1132 allows inputting a detailed description for trigger 1100.

Area 1133 allows attaching one ore more locations to trigger 1100. As described above, a location may be a) measured and whose co-ordinates can be derived in a particular spatial reference system, for example using latitude and longitude such as "38° 53'23"N, 77° 00'27"W"; or b) described in a textual form, e.g. "San Francisco, Calif.". In the example depicted in FIG. 11, trigger 1100 has a textual location "World" attached, which indicates that trigger 1100 is not to be limited to a specific location on earth.

Area 1134 allows attaching a robot to trigger 1100 in order to have trigger 1100 watched. An example implementation of a definition of a robot is described in detail below.

Area 1136 allows deleting trigger 1100, saving changes or leaving it untouched. Of course, while this user interface approach is an embodiment of the present invention, the present invention is not limited to this user interface approach and there may be additional or alternative ways to display or customize a trigger.

FIG. 12 is a screen shot of an example implementation depicting how to edit a robot.

Robot 1200 currently has two watches: watch 1204 watching trigger 1206 and watch 1220 watching trigger 1221. Each watch can be set to become active upon detecting a predefined trigger statement status of its watched trigger as follows:

Action condition selector 1208 allows selecting one of the trigger 1206's default actions according to its type as explained above, or a general filter option "anything" or "anything but on stand-by". For example, selecting "anything" will fulfill the action condition of watch 1220 no matter what the action status of trigger 1221 is, while "anything but on stand-by" will only fulfill the action condition of watch 1220 if trigger 1221's action is set to "trigger is on stand-by".

Value condition selector 1212 allows selecting the following options: "is anything", "is greater than", "is greater than or equal", "is", "is smaller than or equal", "is smaller than". Of course, the present invention is not limited to these options and there may be additional or alternative options.

The value condition of watch 1204 is fulfilled in this example, since value condition selector 1212 is currently set to "contains", value condition area 1214 is set to "2.3", value unit condition selector 1208 is set to "%" and trigger 1206's current value is 2.3%. Setting value condition selector 1212 to "is anything" would always fulfill the value condition of watch 1204.

Comment condition area 1210 allows to input one or more characters, numbers or words that have to be part of the latest comment of trigger 1206 in order to fulfill the comment condition of watch 1204. Since comment condition area 1210 is empty, the comment condition of watch 1204 is currently fulfilled.

If all three conditions of watch 1204 are fulfilled, its action condition, its value condition and its comment condition, the watch 1204 is fulfilled and will output the number of reaction points defined in reaction point area 1216. In the present example, watch 1204 is fulfilled and outputs 10 reaction points as depicted in simulation sub area 1218.

Watch 1220 is currently not fulfilled, as its action condition is not fulfilled. Watch 1220 will therefore not output any reaction points.

Total current reaction point simulation area 1224 indicates the total current reaction point output of all active watches of robot 1220, which is 10 in this example. All simulation point areas will be updated in the present view whenever a watched trigger status changes, as to allow for easier understanding of the effects of set watch conditions.

Using button 1222, more watches can be added to robot 1200.

Using button 1223, a watch, in this case 1220, can be deleted.

Robot 1200 has currently one reaction 1225. Reaction point selection area 1226 contains lower and an upper reaction point input areas. If the current total reaction points depicted in area 1224 are within the set lower and upper points of reaction 1225, as it currently is, reaction 1225 is activated and its currently set "send e-mail" and "update trigger" actions 1230 and 1232 are initiated, as also indicated using simulation checkboxes 1238 and 1240.

"Send instant message" action area 1228 and "call the following URL" action area 1234 are not checked and thus not initiated.

Using button 1236, more reactions can be added to robot 1200.

Using one of buttons 1242, robot 1200 can be left untouched, deleted or saved.

The invented approach allows for a very versatile, yet easy to use and understand way of setting simple to complex robot watch conditions and reactions. Of course, while this user interface approach is an embodiment of the present invention, the present invention is not limited to this user interface approach and there may be additional or alternative ways to display or customize a robot.

FIG. 13 is a screen shot of an example implementation depicting how to update a celebrity trigger using view 1300. In contrast to a predictive or a reporting trigger (see example below), in this example, a celebrity trigger's designation (here 1302) can be edited whether the trigger is published or not.

In addition, a celebrity trigger's action selection area (here 1310) comprises the default actions for predictive triggers (here 1304), as well as the default actions for reporting triggers (here 1306 and see example below).

In addition, a celebrity trigger's action selection area (here 1310) comprises stand-by selection option 1308 that is available across trigger types.

Other editable areas can be updated as described above.

While there may be additional or alternative trigger action selections for celebrity triggers, it is a key aspect of the present invention to provide the depicted default selections for celebrity triggers in order to provide a general standard throughout a trigger system that can be depended upon by participants. This can be particularly beneficial, for example, in order to enable participants across various languages to easily define robots or external software that can analyze and process trigger updates in a clearly defined way.

FIG. 14 is a screen shot of an example implementation depicting how a subscribed trigger 1400 may be presented to a subscriber. As trigger 1400 is not owned but merely subscribed by fictitious trigger system participant Peter, Peter is presented with trigger 1400's latest trigger statement 1402, but cannot update the trigger statement.

Area 1404 allows Peter to edit his subscription of the trigger 1400, for example, to extend, pause or end his subscription of trigger 1400.

Area 1406 allows Peter to rate trigger 1400 since he is a subscriber but not an owner of the trigger. In addition, area 1406 allows Peter to see the ratings of other subscribers, or report fraud, such as alleged infringement of copyrights, an inappropriate icon, inappropriate content, or the like.

Sharing area 1408 allows sharing a link to a public view of trigger 1400 (not shown) ratings, and comments with connected friends or other acquaintances via one or more social networks, for example.

FIG. 15 is a screen shot of an example implementation depicting a view of a trigger system participant at a trigger that he neither owns nor is subscribed to.

Since the trigger system participant, here again Peter, is not subscribed to trigger 1500, he is only presented with the designation, but not with the full trigger statement of trigger 1500. In addition, area 1504 allows subscribing to the trigger 1500 and area 1506 allows reporting fraud as described above.

Sharing area 1508 allows sharing a link to a public view of trigger 1500 (not shown) and comments with connected friends or other acquaintances via one or more social networks, for example.

FIG. 16 is a screen shot of an example implementation depicting a view on a trigger request 1600.

1602 shows the title of trigger request 1600.

1604 shows the description of trigger request 1600.

1606 depicts how much time ago the trigger request 1600 was created, for example, according to the current trigger system time.

1610 shows how much time ago the latest pledge was received for trigger request 1600, for example, according to the current trigger system time.

1608 shows the current number of supporters of trigger request 1600. The term supporters shall mean participants in the trigger system that hosts trigger request 1600, the participants having actively pledged in support of trigger request 1600 using, for example, button 1620 in the current view.

1612 shows the current total pledged amount of all current supporters of trigger request 1600.

Area 1614 allows requesting a list of latest comments attached to trigger request 1600 and to attach a new comment to trigger request 1600.

Sharing area 1616 allows sharing a link to a public view of trigger request 1616 (not shown) and comments with connected friends or other acquaintances via one or more social networks, for example, in order to rally additional supporters and pledges for the trigger request 1600.

Button 1618 allows attaching a particular type of comment to trigger request 1600 that may be automatically forwarded to all supporters of trigger request 1600 in case one or more of the requested kind of trigger or at a least very similar trigger was already seen elsewhere within a trigger system. This approach allows turning insights of one or more participants in a trigger system easily into potential value for other participants in the trigger system.

Button 1622 allows requesting to see a list of currently accessible trigger requests.

FIG. 17 is a screen shot of an example implementation depicting a view of a profile of a participant in a trigger system.

View 1700 shows a public profile 1702 and a private profile 1704 of the participant.

Public profile 1702 is accessible to anybody having access to the trigger system that is hosting profile 1702.

Private profile 1704 is accessible only to the participant owning profile 1704 and any delegates including, for example, administrators of the trigger system that is hosting profile 1704.

Area 1706 shows the current account balance of the participant in view and provides means to refill the account balance, for example, via a credit card transaction.

Area 1708 shows the current income account balance of the participant in view and provides means to request a payout of the available income balance, for example, to the checking account or credit card of the participant in view.

Area 1710 shows the current vUnits account balance of the participant in view as well as means to add additional vUnits, for example, by buying additional vUnits and deducting the respective charge from the present participant's account or income account balance.

Area 1712 allows changing the current service level of the participant in view.

Button 1714 allows saving changes made to profile 1702 and 1704.

FIG. 18 is a screen shot of an example implementation depicting a feedback input of a participant in a trigger system.

Feedback input area 1800 allows selecting from a multitude of feedback types using feedback type selector 1802, inputting a feedback subject using subject input field 1804 and inputting a feedback description using description input field 1806.

The resulting feedback may be submitted using button 1808.

FIG. 19 is a screen shot of an example implementation depicting how to update a reporting trigger. Reporting trigger 1900 may be updated using the heretofore-described input areas. However, unlike a celebrity trigger, a reporting trigger's designation (here 1902) may typically only be changed as long as there is no active subscriber for the reporting trigger (here 1900). Also, action selector 1904 only allows selecting one of the default reporting triggers' actions or, alternatively, stand-by option 1906 that can be selected across all trigger types.

While there may be additional or alternative trigger action selections for reporting triggers, it is a key aspect of the present invention to provide the depicted default selections for reporting triggers in order to provide a general standard throughout a trigger system that can be depended upon by participants. This can be particularly beneficial, for example, in order to enable participants across various languages to easily define robots or external software that can analyze and process trigger updates in a clearly defined way.

Additionally, trigger 1900 has a textual location 1908 "Palo Alto, 94304" attached, which indicates that trigger 1900 refers to a specific area within the United States of America, namely the ZIP code 94304, which is located within the city of Palo Alto, Calif. A Zone Improvement Plan (ZIP) Code is the numerical code assigned by the United States Postal Service to designate a local area or entity for the delivery of mail within the United States. Of course, there may be many additional or alternative ways to designate a local area inside and outside the United States as described above.

Figure 20:
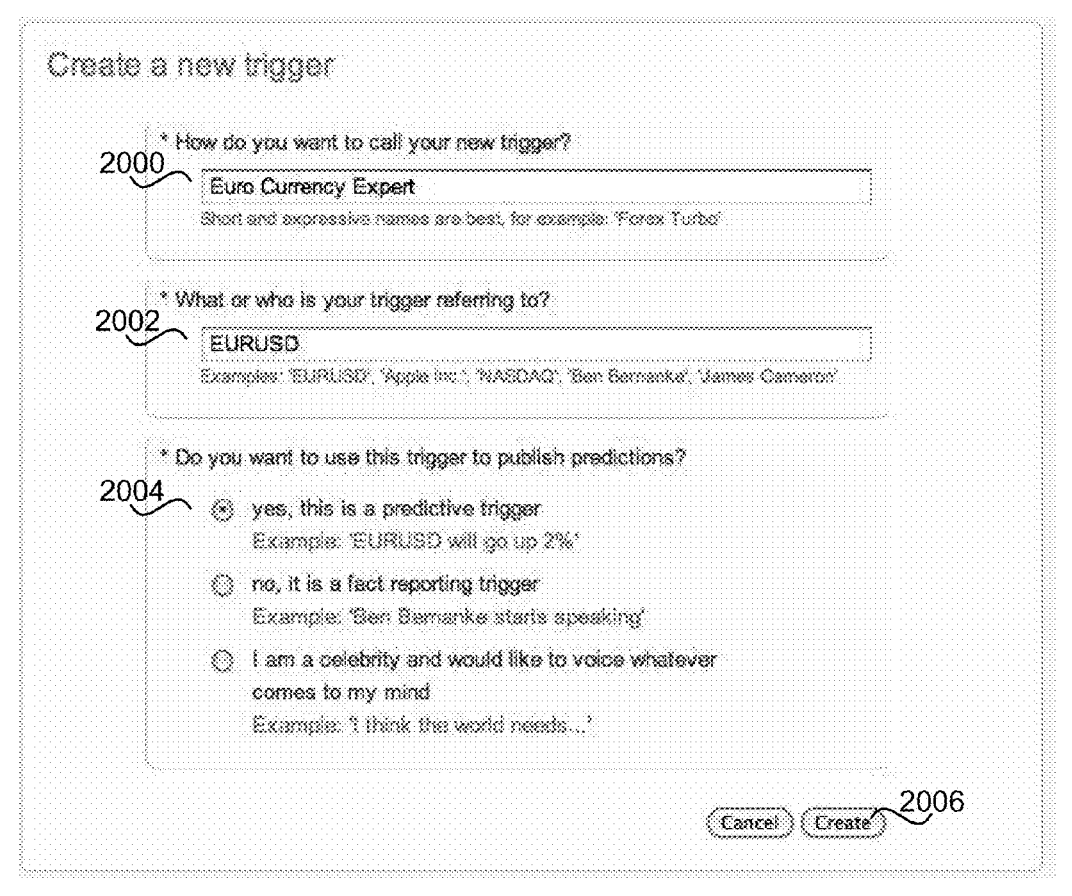

FIG. 20 is a screen shot of an example implementation depicting how to create a trigger in a first step. In this example, in order to simplify the creation of triggers for participants in a trigger system, the trigger creation process is performed in two steps. FIG. 20 depicts the input areas that are part of step 1.

Now referring to FIG. 20, input field 2000 allows inputting a title for the new trigger.

Input field 2002 allows inputting a designation for the new trigger.

Trigger type selector 2004 allows selecting one of the available trigger types that are described above.

Upon input of mandatory data 2000, 2002 and 2004, create button 2006 allows creating the new trigger in the present trigger system (not shown) and finalizes step 1. Once step 1 is performed, depending on the trigger type selected with 2004, step 2 is performed showing the above described trigger edit input views for either a predictive, reporting or celebrity trigger.

Referring now to FIG. 21, another preferred embodiment of the present invention is shown illustrating a method to accelerate the distribution of advertisements and increase respective conversion. This method is also explicitly claimed as part of the present invention.

Dotted area 2100 indicates a typical approach for a seller 2112 to advertise an offer 2110, for example "20% off product x only today", to a target audience 2102. In the illustrated typical approach, seller 2112 would distribute the offer content 2110 via various channels, such as e-mail, online or other, for example print media, radio or television to a target audience 2102. Typically, offer content 2110 will point the target audience 2102 to an offer landing page 2104 on the Internet that allows potential buyers among the target audience 2102 to learn more about the offer 2110 and initiate respective orders 2106.

Typically, a main goal for success of this typical approach is to maximize the number of orders created by the target audience. Typical key influence factors for reaching this goal are the size of the target audience as well as the quality of the selection of the target audience based on the offer. Both of these influence factors are typically not easy to optimize, as engagement cost for the seller increases with the size of a target audience as well as with identifying and engaging higher quality target audiences.

In contrast, the present invention allows the seller 2112 with minimal effort and cost to engage additional, high quality target audiences to the depicted existing advertisement approach 2100 using a trigger system 2150 in the following way:

In addition, or alternatively, to the above-described typical channels, Seller 2112 publishes offer 2110 via a Trigger1 2160 on marketplace 2152. In this case, as per FIG. 1, Trigger1 2160 may be created and published as a reporting trigger with the designation "Product X", the seller as the trigger source, the action "is", the value "20", the unit "%" and the value comment "off only today". In addition, a more detailed description of the offer 2110 may be attached to Trigger1 2160 as well as a link to the offer landing page 2104.

Once published on marketplace 2152, a multitude of participants of the trigger system 2150 including micro businesses (not shown) may subscribe to Trigger1 2160, deploy their respective intelligences, here represented by 2164 within respective trigger portfolios 2170, by, for example, packaging Trigger1 2160 with another offer, here represented by Trigger15 2162, creating combined or enriched offers, here represented by TriggerX 2166 and publishing their respective resulting triggers, here represented by a multitude of TriggersX 2168 on the marketplace 2152.

As each publishing participant including micro businesses is monetarily or otherwise incentivized to create and distribute the best possible offers in the shortest amount of time to their respective subscribing target audiences 2180, there will be a high propensity to intelligently optimize the quality of each resulting trigger offer to attract interest among respective target audiences.

Also, as the present invention allows distribution of the resulting offer triggers in a highly individualized and accelerated fashion, it provides access to target audiences 2180 that seller 2112 would typically not have reached with typical approach 2100.

Furthermore, buyers among target audiences 2180 will be able use the same offer landing page 2104 as target audience 2102, thus adding to the number of orders for seller 2112 and increasing commercial success with minimal additional cost for the seller 2112.

Additionally or alternatively, buyers among target audiences 2180 can be pointed directly to the web presence of seller 2112 using a direct link 2192 thus eliminating the need and cost for particular offer landing pages altogether.

In the above-described way, publishing participants including micro-businesses can turn their respective intelligence into highly valuable content for their respective subscribers who will in turn provide subscription revenue back to participants including micro businesses. Sellers can seamlessly add new, highly scalable distribution channels to their existing marketing processes with minimal cost and high upside potential in terms of access to new customer segments.

In fact, sellers can even gain subscription revenue by publishing high quality offer triggers via the presently disclosed invention. For example, sellers could first publish time-critical offers via offer triggers to paying subscriber participants including micro-business subscribers on the disclosed market place and then, slightly delayed, publish the same offer via their typical advertisement channels as indicated in area 2100, thus creating an incentive for direct participant subscribers including micro-business resellers to pay subscription fees for receiving valuable offers first.

As a specific example for applying intelligence in the above-described way, a micro business may subscribe to a trigger of a seller who provides time-critical hotel rate opportunities in Las Vegas, Nev. In addition, the micro business also subscribes to triggers that offer deals on rental car and show ticket rates in Las Vegas, Nev. The micro business then publishes an own trigger that advertises package opportunities whenever the micro business spots a particularly interesting combination of a hotel, rental car and show ticket deal in Las Vegas, Nev. based on input from the subscribed triggers. Since the micro business's trigger is attracting a particular target audience based on added value and reputation, the micro business receives growing trigger subscription revenue while the original sellers enjoy respective additional business generated by a subset of the micro business's target audience that the original sellers would typically not have access to.

As yet another example for applying intelligence in the spirit of the present invention, a participant in a trigger system who is a well known celebrity updates one of her triggers with a link to a respective source trigger and a personal comment whenever she spots a great fashion deal published by sellers within the same trigger system. Given her excellent reputation and brand, her trigger's subscribers provide her with significant subscription income for publishing picks of great deals based on her experience and judgment, while the original sellers enjoy additional revenue generated by a subset of her large subscription target audience.

Now referring to FIG. 22, a flow chart is depicted that shows an example operation of the preferred embodiment of FIG. 21.

In step 2200, a seller creates a trigger referring to an offer as described above. In step 2202, if a landing page for the offer is available, step 2206 is performed and a link to the landing page is attached to the trigger. In step 2202, if no landing page for the offer is available, step 2208 is performed attaching a direct link to the seller's web presence to the trigger. This is particularly useful for sellers that do not have the resources or do not want to create landing pages for offers for whatever reason.

In step 2210, the trigger is published on a marketplace of a trigger system in the spirit of the present invention as described above.

In step 2212, a reseller subscribes to the trigger and applies his intelligence, for example, by combining the seller's offer with an offer of another seller, adding a translation or explanation suited for a particular target audience, and the like.

Of course, the reseller may apply his intelligence in a multitude of additional or alternative ways and one of the key advantages of the present invention is to support the reseller in doing so without the need to disclose his intellectual property.

In step 2214, if the reseller chooses to create and publish a new trigger representing the result of applying his intelligence, step 2216 is performed and a new trigger is created and published accordingly on a marketplace of a trigger system.

In step 2214, if the reseller chooses to update one of his existing published triggers with the result of applying his intelligence on the seller's trigger, such update is performed in step 2218.

In step 2220, subscribers of the reseller's chosen published trigger receive the new resulting content and may initiate orders with the original seller accordingly.

Of course, there are many additional or alternative ways to operate the above-described method within the spirit of the present invention.

For example, in addition to publishing his offer trigger within a trigger system, the reseller may send out links pointing to his published trigger, for example via well-known social networks such as Facebook or Twitter, to new target audiences that may not yet be participants of the trigger system. In this case, a subset of the new target audiences may choose to subscribe to the reseller's trigger within the trigger system, thus increasing new trigger subscription revenue potential for the reseller and offer revenue potential for the seller.

As another example, the reseller may choose to publish the offer on more than one market place in more than one trigger system using more than one trigger.

As another example, the present invention can also be used for fundraising and non-profit purposes in novel ways. In this case, for example, the publisher of one or more triggers may ask subscribers to pay as much or as little as they like for sponsoring and in return receiving immediate updates on the programs, people or purposes they would like to sponsor. Thus, instead of giving money in general to one or more organizations, for example, subscribers can very easily and timely route their donations where they feel it is best spent based on timely information. Also, in this way the receiving organizations can build a much more immediate and emotionally including environment to inform and at the same time motivate their donors to keep giving for the most valuable purposes. Using image or video triggers as described below, the present invention can also be used, for example, to provide instant gratification to donors by illustrating progress or success stories stemming from their donations.

As another example, one or more sponsors of a trigger may pay for respective subscription fees for the trigger so that subscribers of the trigger may gain access to the trigger for free. Of course, a publisher may also provide one or more triggers to subscribers for free, for example, to support a brand, drive traffic to an attached URL, feature a particular non-profit cause or service and the like.

FIG. 23 is a screen shot of an example implementation depicting images and videos attached to triggers.

One or more videos and images may, for example, be attached by a publisher to a trigger in the form of one or more URLs pointing to respective files or data sources on the Internet, including IFrames, in the same or similar way as depicted in FIG. 11 (1120). In this case, for example, the publisher may input or copy and paste a particular URL or piece of HTML or other code that contains a particular URL, into one or more respective text fields of a form that allows to relate the input data with the trigger. An IFrame (Inline Frame) is defined as an HTML document embedded inside another HTML document on a website.

Of course, the input data may then be parsed or modified in order to extract and format respective URLs in a desired way. In this case, for example, respective URLs may be extracted from an HTML input, cleansed from potentially unsafe URL parameters and then shortened in order to store them in the most efficient and safe way with, or in relation to, the respective trigger. Of course, URLs may be attached to triggers in any other feasible way known by those skilled in the art.

Additionally or alternatively, one or more icons including images, videos, audio, IFrames, or any other file may be attached directly to a trigger, meaning their respective data is attached to the trigger and not merely a URL pointing to their respective data.

Trigger 2300 has a music video attached that is currently playing with its video controls temporarily hidden to allow an undisturbed view of the video. It is a preferred embodiment of the present invention that both, the attached video as well as other attributes of the trigger 2300 including its title, designation and value may be updated independently from each other. Thus, the video may play while other attributes of the trigger 2300 are updated or vice versa.

In addition, video attributes, such as the current size of the video, trigger 2300's location on the screen, audio volume level or starts and stops at specific frames, for example, may be controlled by attributes of trigger 2300 that can be updated while the video is playing.

Furthermore, URLs attached to trigger 2300, if any, may be updated as well allowing, for example, an interaction of one or more subscribers of trigger 2300 with the publisher of trigger 2300 even while the attached video is playing. Of course, trigger 2300 may contain particular interaction areas such as buttons, sliders and the like (not shown) facilitating the heretofore mentioned interaction.

Trigger 2302 has an image attached that, for example, can be used to advertise a particular product, service or the like. Again, as described above, trigger 2302 may have one or more links attached that may, for example, allow a subscriber of trigger 2302 to see a higher resolution version of the currently presented image when clicking on the image or a specific area on the trigger, visit a web page served from within or from outside the present trigger system, the web page allowing the subscriber to get more detailed information on the advertised product or service, order the advertised product or service and the like.

Trigger 2304 depicts an example of a trigger that was just updated. In this case, trigger 2304 may automatically show respective video controls that may allow a subscriber of trigger 2304, for example, to start watching the attached video, fast forward to a specific frame in the video, select an alternative video resolution, watch the video in a larger view and the like. Of course, starting and pausing the video may also be as easily accomplished as clicking on the video for starting it and clicking on the video again for stopping it and the like.

In the depicted example view, trigger 2314 is a copy of trigger 2304 attached to another trigger group and therefore updated whenever trigger 2304 is updated.

It is a preferred embodiment of the present invention to allow a subscriber the consumption of, and interaction with, more than one video, image or IFrame triggers at the same time. This aspect of the present invention allows, for example, to watch the videos attached to triggers 2300, 2304 and 2314 at the same time, allowing, for example, a much more effective consumption of various visual real-time sources in parallel or enjoying a particular composition of various visual and textual content sources at the same time.

As another example, trigger 2308 has an image attached that depicts a data visualization, for example, to allow easy tracking of multi-dimensional data sources. Of course, alternatively, trigger 2308 may have an IFrame attached that depicts the data visualization plus allows interaction with the data visualization, for example.

Trigger 2310 is another example of an attached data visualization image used in a business scenario. In this case, trigger 2310 is not shown in full height to save screen real estate. Using control 2312, for example, trigger 2310 may be expanded and contracted as needed. Of course, other triggers such as trigger 2300 and 2304 may be contracted and expanded in a similar way to allow for a flexible use of the overall available screen real estate.

Trigger 2306 depicts an example for a news video trigger that is currently only partially seen.

Trigger 2316 depicts a trigger that does not currently have a video or image attached.

Using the present invention in the depicted way, one or more subscribers may easily consume, and interact with, a multitude of visual and non-visual data sources represented by respective triggers that may be periodically updated independently from each other. Since at least a subset of the subscribers may also be publishers of one or more of the respective triggers, the present invention allows not only one-way, but rich interaction between various publishers and subscribers.

This may particularly be beneficial, for example, in the fields of business or scientific data tracking and sharing, entertainment, games, real-time advertising, publishing and consuming of electronic art, publishing and consuming of news and the like.

CONCLUSIONS

The inventions set forth above are subject to many modifications and changes without departing from the spirit, scope or essential characteristics thereof. Other embodiments of this invention will be obvious to those skilled in the art in view of the above disclosure. Thus, the embodiments explained above should be considered in all respect as being illustrative rather than restrictive of the scope of the inventions as defined in the appended claims.

SEQUENCE LISTING

Not Applicable

What is claimed is:

1. An electronic marketplace for sharing, enriching and consuming intelligence data for triggering actions within and outside of said electronic marketplace, said electronic marketplace comprising:
   (a) two or more at least partly standardized information artifacts, wherein each of said information artifacts comprises:
      (1) a symbol, said symbol being unique at least within said electronic marketplace,
      (2) one of one or more types, said types standardized at least within said electronic marketplace,
      (3) a designation,
      (4) one of a plurality of default key actions, said default key actions standardized at least within said electronic marketplace,
      (5) at least one of a value, a value comment,
   (b) one or more interface means, said interface means accessible to two or more participants of said electronic market place,
   (c) said interface means adapted to allow one or more of said participants to create and update one or more of said information artifacts,
   (d) said interface means adapted to allow one or more of said participants to publish updates of their said one or more information artifacts to one or more other participants of said electronic marketplace respectively,
   (e) said interface means adapted to allow one or more of said participants of said electronic marketplace to subscribe to one or more of said updates of said one or more information artifacts, predetermine one or more conditions and one or more of: respective actions within said electronic marketplace, respective actions outside of said electronic marketplace, and invoke said one or more respective actions if said predetermined conditions are fulfilled,
   (f) said interface means adapted to allow one or more of said participants of said electronic marketplace to publish one or more further enriched information artifacts by using the outcome of one or more of said respective actions at least partly as input when updating said further enriched information artifacts.

2. The electronic marketplace of claim 1, wherein one or more attributes of said information artifacts can be updated independently from each other respectively.

3. The electronic marketplace of claim 1, wherein said interface means are adapted to allow said one or more participants to update one or more of their said information artifacts within said electronic marketplace based on a result of said one or more invoked actions outside of said electronic marketplace.

4. The electronic marketplace of claim 1, further comprising one or more robots operable to detect one or more predetermined conditions of said one or more information artifacts and to trigger one or more actions within or outside of said electronic marketplace respectively.

5. The information artifacts of claim 1, wherein one or more of said information artifacts comprise a subscription price.

6. The information artifacts of claim 1, wherein one or more of said information artifacts comprise two or more of a video link, an audio link, an image link, a data link, directly attached data, a location.

7. The interface means of claim 1, wherein said interface means can be used at least partly via the Internet.

8. A method of rapidly sharing, enriching and consuming intelligence data for triggering actions within and outside of an electronic marketplace, said method comprising:
   (a) providing said electronic marketplace,
   (b) providing access to said electronic marketplace for two or more participants of said electronic marketplace,
   (c) providing interface means for said participants, said interface means operable to create and update two or more at least partly standardized information artifacts, wherein each of said information artifacts comprises:
      (1) a symbol, said symbol being unique at least within said electronic marketplace,
      (2) one of one or more types, said types standardized at least within said electronic marketplace,
      (3) a designation,
      (4) one of a plurality of default key actions, said default key actions standardized at least within said electronic marketplace,
      (5) at least one of a value, a value comment,
   (d) adapting said interface means to allow one or more of said participants to create and update one or more of said information artifacts of said electronic marketplace,
   (e) adapting said interface means to allow one or more of said participants to publish updates of their said one or more information artifacts to one or more other participants of said electronic marketplace respectively,
   (f) adapting said interface means to allow one or more of said participants of said electronic marketplace to subscribe to one or more to one or more of said updates of said one or more information artifacts, predetermine one or more conditions and one or more of: respective actions within said electronic marketplace, respective actions outside of said electronic marketplace, and invoke said one or more respective actions if said predetermined conditions are fulfilled,
   (g) adapting said interface means to allow one or more of said participants of said electronic marketplace to publish one or more further enriched information artifacts by using the outcome of one or more of said respective actions at least partly as input when updating said further enriched information artifacts.

9. The method of claim 8, wherein one or more attributes of said information artifacts can be updated independently from each other respectively.

10. The method of claim 8, wherein said interface means are adapted to allow said one or more participants to update one or more of their said information artifacts within said electronic marketplace based on a result of said one or more invoked actions outside of said electronic marketplace.

11. The method of claim 8, further providing one or more robots operable to detect one or more predetermined conditions of said one or more information artifacts and to trigger one or more actions within or outside of said electronic marketplace respectively.

12. The method of claim 8, wherein one or more of said information artifacts comprise a subscription price.

13. The method of claim 8, wherein one or more of said information artifacts comprise two or more of a video link, an audio link, an image link, a data link, directly attached data, a location.

14. The method of claim 8, wherein said interface means can be used at least partly via the Internet.

* * * * *